United States Patent
Sugiyama et al.

(10) Patent No.: US 6,624,859 B1
(45) Date of Patent: Sep. 23, 2003

(54) POLARIZING APPARATUS FOR POLARIZING INSTANT LIGHT HAVING PLANES OF POLARIZATION TO LIGHT HAVING A PARTICULAR PLANE OF POLARIZATION AND METHOD OF MANUFACTURING THE POLARIZING APPARATUS

(75) Inventors: Jun Sugiyama, Suwa (JP); Yuji Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/983,355

(22) PCT Filed: May 14, 1997

(86) PCT No.: PCT/JP97/01617
§ 371 (c)(1),
(2), (4) Date: Jan. 23, 1998

(87) PCT Pub. No.: WO97/43671
PCT Pub. Date: Nov. 20, 1997

(30) Foreign Application Priority Data

May 14, 1996 (JP) .............................. 8-143622
Mar. 17, 1997 (JP) .............................. 9-063651
Mar. 17, 1997 (JP) .............................. 9-063652

(51) Int. Cl.$^7$ .......................... G02F 1/1335; G02B 5/30
(52) U.S. Cl. ......................... 349/96; 349/194; 252/585; 359/494
(58) Field of Search ................. 349/96, 194; 252/585; 359/483, 485, 494, 497, 500

(56) References Cited

U.S. PATENT DOCUMENTS

| 5,157,526 A | | 10/1992 | Kondo et al. |
| 5,479,277 A | * | 12/1995 | Fergason ...................... 359/51 |
| 5,659,411 A | | 8/1997 | Nito et al. |
| 5,900,977 A | * | 5/1999 | Hikmet ...................... 359/497 |

FOREIGN PATENT DOCUMENTS

| EP | 0 465 133 A2 | 1/1992 |
| JP | A-4-212104 | 8/1992 |
| JP | A-6-174919 | 6/1994 |
| JP | A-6-331824 | 12/1994 |
| JP | A-7-64048 | 3/1995 |
| WO | WO 95/17692 | 6/1995 |

OTHER PUBLICATIONS

J. Hajto et al, Natural Optical Activity and Related Phenomena in As/sub 2/S/sub 3/Glasses, Database Inspec: Institute of Electrical Engineers, Stevenge, GB; Inspec. No. 1389860. (abstract).

* cited by examiner

Primary Examiner—Robert H. Kim
Assistant Examiner—Andrew Schechter
(74) Attorney, Agent, or Firm—Oliff & Berridge, PLC

(57) ABSTRACT

A polarizing apparatus extracts light amount of which is increased by incidence of light (10, 12) having a plurality of planes of polarization, and by aligning the planes of polarization. This polarizing apparatus can be used as a polarizer for a liquid crystal display device (optical transducer), or can be disposed as a preliminary stage before a polarizer. Molecules of an optically active material (1) rotates the plane of polarization through an optical rotation angle $\theta 1$ when a first vector component 10 of light having a horizontal plane of polarization passes, and rotates the plane of polarization through an optical rotation angle $\theta 2$ (>$\theta 1$) when a second vector component of light having a vertical plane of polarization passes. Therefore, light having a horizontal plane of polarization is amplified, and light having a vertical plane of polarization is reduced. To bestow the anisotropy of the optical rotation angle on the large number of molecules making up the optically active material molecular constituents of the optically active material are substantially aligned in three dimensions. By this means, the efficiency of use of the incident light can be increased, and a brighter display can be obtained, or the power consumption of the light source can be reduced.

62 Claims, 19 Drawing Sheets

POLARIZING APPARATUS FOR POLARIZING INSTANT LIGHT HAVING PLANES OF POLARIZATION TO LIGHT HAVING A PARTICULAR PLANE OF POLARIZATION AND METHOD OF MANUFACTURING THE POLARIZING APPARATUS

FIELD OF THE INVENTION

The present invention relates to a polarizing converter, and a method of manufacturing the same, which increases and extracts luminous light with a specific plane of polarization by rotating and adding luminous flux having a different plane of polarization, when luminous flux with a large component of the specific plane of polarization is extracted by the incident of natural light with a plurality of planes of polarization at the polarizing converter. The present invention further relates to an optical transducer using the polarizing apparatus, and an electronic device using this optical transducer.

PRIOR ART

As one example of an optical transducer using the polarization of light may be cited a liquid crystal display device. As such a device is known, for example, the backlit liquid crystal display device 300 shown in FIG. 23. In this liquid crystal display device 300, on the side from which light from a backlight 310 is impinged on a liquid crystal cell 320, a polarizer 330 is disposed before the liquid crystal cell 320, and light passing through the liquid crystal cell 320 is passed through an analyzer 340.

Light emitted from the backlight 310 has planes of polarization in all directions, but this light can be thought of as including, for example, luminous flux having a vector component in the vertical direction and luminous flux having a vector component in the horizontal direction orthogonal to the vertical direction. In optical terms the former could be referred to as the p-polarized light and the latter as the s-polarized light.

The polarizer 330 is an absorbing or reflecting type which for example allows the component of luminous flux in the vertical plane to pass, while not allowing the component of luminous flux in the horizontal plane to pass. In a liquid crystal display device, the absorbing type is normally used. In a normally-white liquid crystal display device, the polarizing plane of light passed through the analyzer 340 lets the light passed through the polarizer 330 coincide with the plane of polarization rotated through the given twist angle of the liquid crystal cell 320.

For natural light, the vector components in the vertical and horizontal polarizing planes are each 50%. Therefore, in principle 50% of the light is lost when the light is passed through the polarizer 330. In practice, taking the incident light as 100%, because of other losses the light passed by the polarizer 330 is not more than 35%.

In a reflective liquid crystal display device, the light-transmitting performance of the polarizer disposed on the side of the incident light is similar to that of the above backlit type of liquid crystal display device.

Thus, in a conventional liquid crystal display device 300 using the polarizer 330, only a portion of the incident light can be used for display, and this is an obstacle to the reduction of power consumption and the increase of luminosity of liquid crystal display devices.

For example, in a backlit type of liquid crystal display device 300, since the use efficiency of the light at the polarizer 330 is low, a light source capable of providing at least twice the amount of light that can be transmitted by the polarizer 330 is required. For this reason, conventionally, in for example a notebook computer provided with a liquid crystal display device, a large proportion of the required power supply is consumed by the backlighting light source. As a result, unless the power for the backlighting can be reduced, there is a limit to the degree to which the power consumption of the liquid crystal display device can be reduced.

Moreover, since the light from the backlighting is absorbed by the polarizer (polarizing plate), and is converted to heat, the panel surface becomes hotter, exerting a deleterious influence on the elements of the panel, the chemical structure of the liquid crystal, and so forth. Thus, it reduces the optical performance and the reliability of the liquid crystal display device.

The object of the present invention, considering these problems with the prior art, is to provide a polarizing apparatus which significantly eliminates the losses occurring when aligning the direction of polarization of incident light, and allows the optical efficiency to be improved.

Another object of the present invention is the provision of a method of fabricating the polarizing apparatus which can be applied to the manufacture of a polarizing apparatus of the above description.

A further object of the present invention is to construct an optical transducer such as a liquid crystal display device using the above polarizing apparatus, so as to provide an optical transducer such that the optical efficiency can be improved, and a brighter display screen can be achieved, or a substantial reduction in the power consumption of the light source can be attained.

Yet another object of the present invention is to construct an electronic device using the above optical to transducer, so as to provide an electronic device in which the optical efficiency can be improved, and a brighter display screen is achieved, or the power consumption of the light source can be substantially reduced, whereby further as a result of the improved optical efficiency the functional reliability can be improved and the device can be made more compact.

DISCLOSURE OF THE INVENTION

According to one aspect of the present invention, a polarizing apparatus for polarizing incident light having planes of polarization to light having a particular plane of polarization, comprising:

an optically active material disposed so as to exhibit anisotropy with respect to the optical activity; and wherein the optically active material increases the intensity of luminous flux having the particular plane of polarization and reduces the intensity of luminous flux having a plane of polarization perpendicular to the particular plane of polarization.

The property of optical activity exhibited by the optically active material used in the present invention refers to the phenomenon whereby when plane polarized light passes through a material, the emitted light has a plane of polarization rotated through a particular angle with respect to the incident light. The material exhibits such phenomenon referred to optically active material.

Optically active materials can be broadly divided into two classes: those which exhibit optical activity in a crystalline structure in which the molecules have no chiral center, and organic substances possessing a chiral center such as an asymmetric carbon atom within the molecule. Examples of the former include quartz, cinnabar, lithium-potassium sulfate, $LiKSO_4$, sodium perchlorate and sodium bromate. Examples of the latter include lactic acid, tartaric acid, tartrates, sucrose, alanine, grape sugar, ard glucose.

Taking as an example the case of an organic substance in which the molecules include a chiral center, for a single molecule, as shown in FIG. 1, a first incident vector component 10 of incident light in a certain plane of polarization, being for example the horizontal plane of polarization as shown in FIG. 1, is rotated within the optically active material 1 through an angle $\theta1$ with respect to the horizontal plane of polarization. Meanwhile a second incident vector component 20 of incident light in the other plane of polarization, being for example the vertical plane of polarization as shown in FIG. 1, is rotated within the optically active material 1 through an angle $\theta2$ with respect to the vertical plane of polarization. The relative magnitudes of the optical rotation angles are for example such that $\theta1<\theta2$. Thus viewing a single molecule it exhibits anisotropy of optically activity.

However, with a large number of molecules in a solid in the amorphous state, in a polymer, or in an aqueous solution, the anisotropy of each individual molecule is unordered, and mutually canceled out ever the number of molecules, so that the optical rotation angle becomes the same in all orientations and the anisotropy is lost.

In the present invention, it is possible to use an optically active material disposed so as to exhibit anisotropy of optically activity. For this purpose, the optically active material comprises optically active molecules, and three-dimensional orientations of the optically active molecules are aligned in order to produce the anisotropy with respect to the optical activity even in the bulk.

As shown in FIG. 1, a first incident vector component 10 of incident light having the horizontal plane of polarization, is rotated through an angle $\theta1$ to become a first emitted vector component 12. Meanwhile a second incident vector component 20 of incident light having the vertical plane of polarization is rotated through an angle $\theta2$, to become a second emitted vector component 22. At this time the optically active material is disposed so as to exhibit anisotropy such that $\theta1<\theta2$.

The first emitted vector component 12 after rotation can be split into a first horizontal vector component 12a and a first vertical vector component 12b. Similarly the second emitted vector component 22 after rotation can be split into a second horizontal vector component 22a and a second vertical vector component 22b.

When compared with the original first incident vector component 10, the transmitted first horizontal vector component 12a is hardly reduced from the horizontal vector component thereof, and the transmitted first vertical vector component 12b is slightly increased. On the other hand, when compared with the original second incident vector component 20, the transmitted vertical vector component 22b is considerably reduced, and the transmitted second horizontal vector component 22a is increased.

Therefore, the total horizontal vector component of the emitted light is larger than the total vertical vector component.

Thus, by impinging the light on an optically active material with anisotropy, it will be seen than polarizing conversion such as to increase the amount of light having a particular plane of polarization occurs.

Each of the molecules may comprise for example a rigid molecule portion, a chiral center joined thereto, and at least one substituent joined to the chiral center, wherein the direction from the rigid molecule portions to the chiral centers are substantially aligned in the same direction, and the three-dimensional orientations of the substituents seen from the chiral centers are aligned in substantially the same direction. By this means, the above described anisotropy of optical activity is ensured.

The optically active material may be formed with a polymer. In this case, the three-dimensional orientations of the optically active molecules are substantially aligned by stretch-orientation of the polymer. By this means, the anisotropy of optical activity can be ensured.

The optically active material may have a given thickness in the passing direction of the light necessary for polarizing conversion, and may be divided into a plurality of layers in the direction of the given thickness. The three-dimensional orientations of the optically active molecules in each layer may be differently aligned for each layer, so as to increase the intensity of light flux having the particular plane of polarization. At this time, with regard to the mutual positioning of the layers, it is preferable for the layers to have the three-dimensional orientations of the optically active molecules constituting each layer and aligned differently, so as to increase the intensity of light flux having the particular plane of polarization to a maximum. Specifically, a subsequent layer should be oriented so that the component with the plane of polarization of maximum magnitude obtained from a previous layer can be further increased.

That is to say, the layers may be constituted by polarizing layers formed of the optically active material laminated in the direction of passage of light. In this way, each layer increases for example the horizontal component in FIG. 1 and reduces the vertical component, and it is possible for the amount of light having a particular plane of polarization to be further increased. At this time, with regard to the mutual positioning of the layers, it is preferable for the layers to have the three-dimensional orientations of the optically active molecules constituting each polarizing layer, and aligned differently so as to increase the intensity of luminous flux having the particular plane of polarization to a maximum.

Even further, the optically active material may be constituted by an anisotropic crystalline structure having a thickness in the direction of passage of the incident light, in order to amplify light having the particular plane of polarization is amplified and to reduce light having a plane of polarization perpendicular to the particular plane of polarization, when the incident light passes through the optically active material.

The optically active material may further include a combined base polymer.

In this case, compared with the case in which the optically active material alone is used, the fabrication of the polarizing apparatus is made easier.

The optically active material may be combined in a state of solution in the base polymer.

The base polymer used in this case may be a water-soluble base polymer comprising at least one of polyvinyl alcohol, polyvinyl pyrollidone, and polyamino acid; and
  wherein the optically active material is a water-soluble optically active material comprising at least one of tartaric acid, lactic acid, tartrates, sugars, amino acids, and their derivatives.

As other combinations, the base polymer may be an organic solvent-soluble polymer comprising at lest one of polyvinyl acetate, polymethyl methacrylate, polyethyl methacrylate, epoxy resin, alkyd resin, urea resin, nitrocellulose, cellulose acetate, polyethylene terephthalate, nylon, phenol resin, phenol/resol resin, polyvinyl chloride, polyvinylidene chloride, vinyl chloride and vinyl acetate copolymer, and polystyrene and styrene/acrylonitrile copolymer; and wherein the optically active material is an organic solvent-soluble optically active material comprising at least one of chiral smectic C phase and I phase liquid crystals, liquid crystal composites, and amino acid esters.

In the present invention, crystals of the optically active material having anisotropy with respect to optical activity may be dispersed in combination with the base polymer.

In this case, as combinations the base polymer may be a water-soluble base polymer comprising at least one of polyvinyl alcohol, polyvinyl pyrollidone, and polyamino acid; and wherein the optically active material is a water-insoluble optically active material comprising at least one of chiral smectic C phase and I phase liquid crystal, quartz, and cinnabar crystals.

As other combinations, the base polymer may be an organic solvent-soluble polymer comprising at lest one of polyvinyl acetate, polymethyl methacrylate, polyethyl methacrylate, epoxy resin, alkyd resin, urea resin, nitrocellulose, cellulose acetate, polyethylene terephthalate, nylon, phenol resin, phenol/resol resin, polyvinyl chloride, polyvinylidene chloride, vinyl chloride and vinyl acetate copolymer, and polystyrene and styrene/acrylonitrile copolymer; and wherein the optically active material is an organic solvent-insoluble optically active material comprising at least one of quartz, cinnabar, lithium-potassium sulfate, sodium perchlorate or sodium bromate, sugars and their derivatives, or glycoprotein crystals.

The optically active material includes a substance possessing the following formula:

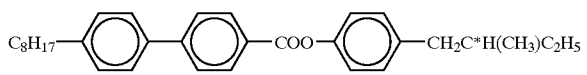

The optically active material includes a substance possessing the following formula:

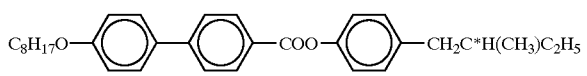

The optically active materials having the above two formulas may have the principal linking direction of the rigid molecular portion from the $C_8H_{17}$ to the asymmetric carbon atom of the optically active molecules aligned in substantially the same direction, and the three-dimensional orientation of the substituents $CH_2$, $C_2H_5$, and H are substantially equal.

Furthermore, the base polymer preferably has combined therewith an optically active material being formed of water-soluble macromolecules, and having as a constituent substance at least one of polyamino acids, main chain or side chain macromolecular liquid crystals, polysaccharides, glycoproteins, and their derivatives. Alternatively, the base polymer preferably has combined therewith an optically active material being formed of organic solvent-soluble macromolecules, and having a polyester type macromolecular liquid crystal in which the monomer element has a chiral center.

If the base polymer exhibits optical activity, then optical rotation can also be carried out by optical activity of the optically active material itself combined with the base polymer, and a larger optical rotation can be applied to the incident light.

In this case it is preferable that the base polymer has to wavelength distribution characteristics which compensate for the wavelength distribution characteristics with respect to optical activity of the optically active material combined with the base polymer.

By this means, uniform wavelength distribution characteristics can be obtained for the polarizing apparatus, and the situation in which the light emitted from the polarizing apparatus is tinged with a color can be avoided.

Further, the optically active material other than the base polymer may comprise various kinds of optically active materials, and one of the optically active materials exhibits waveform distribution characteristics which compensate the waveform distribution characteristics with respect to optical activity in the visible light spectrum of another optically active material.

In this case again, uniform wavelength distribution characteristics can be obtained for the polarizing apparatus.

In the present invention, a liquid may be used as the optically active material.

In this case, the polarizing apparatus may have an optically active material including a fluid sugar solution exhibiting optical activity is sandwiched between two transparent plates each of which having a surface provided with an oriented film facing another oriented film. By making the angle between the two oriented films correspond to the angle through which the light is finally to be rotated, the amount of light of the particular plane of polarization can be increased to the maximum.

Alternatively, between two transparent plates having surfaces provided with transparent electrodes, the polarizing apparatus may have sandwiched an optically active material including a ferroelectric liquid crystal having fluidity and exhibiting optical activity, and adapted so that a voltage can be applied between electrodes of the two transparent plates.

Since the ferroelectric liquid crystal which is the optically active material exhibits orientation in response to an electric field, it can be oriented in a specific direction by application of a voltage, and the amount of light of the particular plane of polarization can be increased to the maximum.

As one application of the above-mentioned polarizing apparatus, the polarizing apparatus can be disposed as a preliminary stage before a polarizer of an optical transducer, or alternatively it can be used as the polarizer itself.

This polarizing apparatus amplifies light having a particular plane of polarization to have greater quantity than the incident light, and can pass this light through a polarizer to the liquid crystal cell, or directly to the liquid crystal cell. As a result, light of a different plane of polarization which would in a conventional polarizing device have been absorbed by the polarizer can be used as light for the display, and the liquid crystal display can be made brighter.

Further, in an optical transducer (such as a liquid crystal display device) using a backlight as a light source, even with a reduced power rating for the light source the same brightness can be obtained, so that the large amount of power for the light source consumed for the liquid crystal display can be reduced, and the device can be made more compact.

The optical transducer may have a lamp unit provided as a light source, and the polarizing apparatus may be disposed immediately adjacent to the output side of the lamp unit. In this way, the required number of polarizing apparatus is to reduced, and the optical design can be simplified, among other benefits.

Furthermore the optical transducer may comprise a liquid crystal cell which is either a transmitting or a reflecting type.

Further again, by provision of the above described optical transducer, an electronic device may be constituted, having a display screen formed for display of information depending on the state of liquid crystal molecules of the liquid crystal cell.

This electronic device may be a liquid crystal projector, or it may be a personal computer with multimedia support, or an engineering workstation (EWS), or it may further be a pager, a portable telephone, a word processor, a television, a video recorder of the viewfinder type or of the directly viewed monitor type, a digital still camera, an electronic notebook, an electronic calculator, a car navigation device, a point-of-sale terminal, or a device equipped with a touch panel.

Yet further by way of example, such an electronic device may be beeper, a hand-held terminal, a watch, or the like. Moreover, this is not restricted to a device using liquid crystals, as in a liquid crystal display device, but may be applied to any optical element using a polarization effect, such as an element having an electrooptic effect which rotates a particular plane of polarization by the application of a voltage, or an optical switch using the same.

The method of the present invention is a method of manufacturing a polarizing apparatus for polarizing incident light into light having a particular plane of polarization comprising:

a combining step for combining a base polymer and an optically active material;

a casting step for pouring the combined solution into a film;

a drying step for drying and hardening the solution formed into a film; and a stretching step for applying tension to and stretching the hardened film.

In the method of the present invention, in the casting step in which the combined solution of base polymer and optically active material is poured into a film, the molecules of the optically active material are naturally aligned in the direction of least resistance. Then in the stretching step after drying, the optically active molecules which have been to a certain degree aligned in the casting step, have their orientation further oriented by the stretching step. In this way, the anisotropy of optical activity is obtained.

In this method, in the casting step it is preferable that the combined solution is poured along at least one groove. This is because the molecules tend to be aligned along the groove.

BEST MODE FOR CARRYING OUT THE INVENTION

The present invention is now described in terms of a number of preferred embodiments, with reference to the drawings.

First Embodiment

Overall Description of the Device

Figure 2:
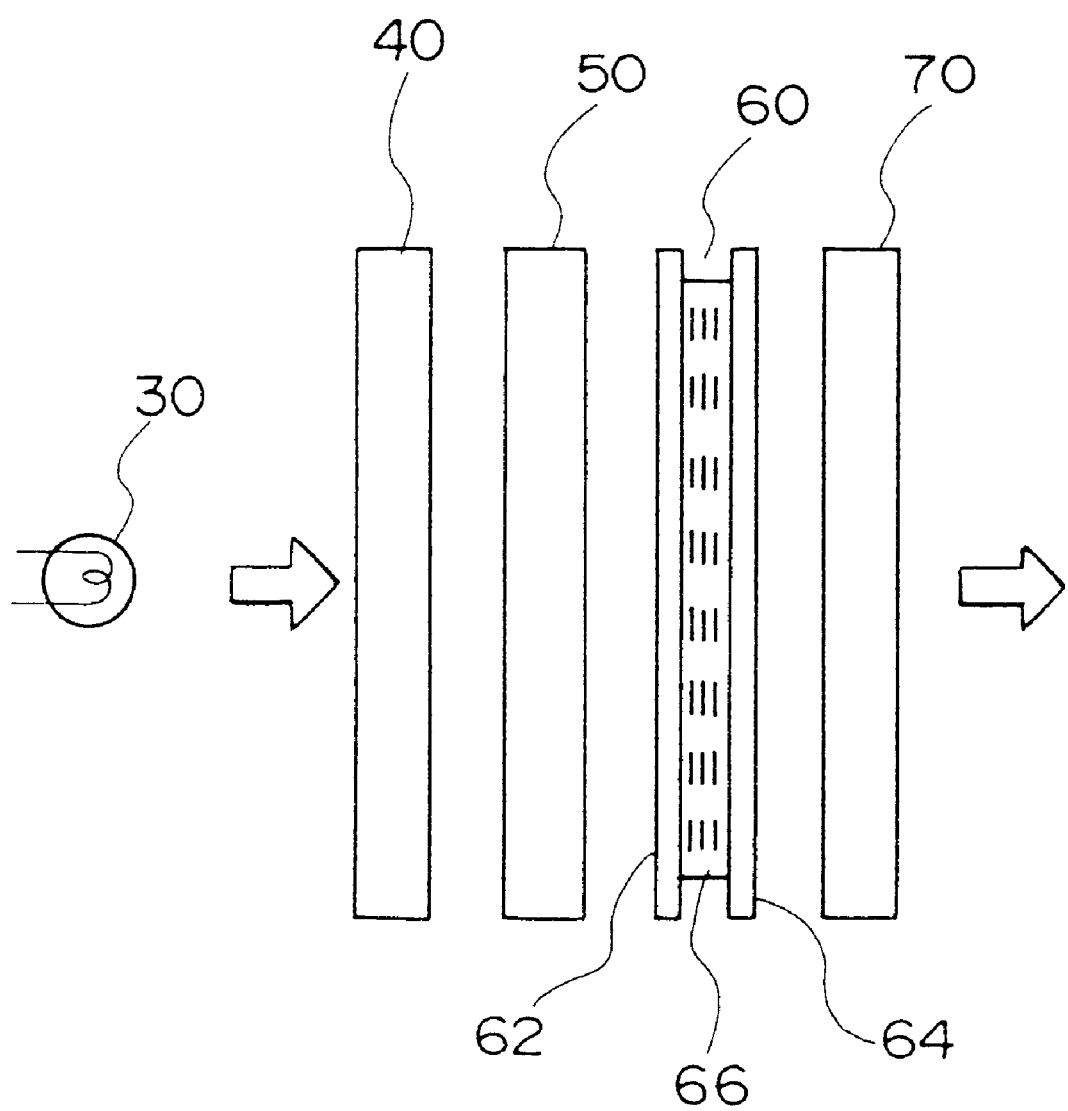
FIG. 2 is a schematic illustration of a liquid crystal display device, being a first embodiment of the optical transducer of the present invention.

FIG. 2 is a schematic illustration of a liquid crystal display device, being a first embodiment of the optical transducer of the present invention. In FIG. 2, this liquid crystal display device comprises a backlight 30, a polarizing apparatus 40, a polarizer 50, a liquid crystal cell 60, and an analyzer 70. Light emitted from the backlight 30 has plane of polarization to all directions. The polarizing apparatus 40, on which the light from the backlight 30 impinges, amplifies and outputs light having a particular plane of polarization. In the stage subsequent to the polarizing apparatus 40 is provided the polarizer 50, which transmits only the light which has the particular plane of polarization, out of the light passing through the polarizing apparatus light and absorbs light having a different plane of polarization, Therefore, the plane of polarization of light which can pass through the polarizer 50 coincides in direction with, that is to say, is parallel to, the particular plane of polarization of light amplified by the polarizing apparatus 40.

Further subsequent to the polarizer 50 is provided for example the twisted nematic (TN) liquid crystal cell 60, which has two glass plates 62 and 64 within which a TN liquid crystal 66 are sealed. On one of the two glass plates 62 and 64 is provided transparent pixel electrodes, connected to a for example two-terminal (MIM, metal layer—insulation layer—metal layer) or three-terminal (for example, TFT, thin-film transistors) active element, and on the other of the glass plates are provided opposing transparent electrodes. When the voltage difference between the transparent pixel electrodes and opposing transparent electrodes is low, the TN liquid crystal cell 60 rotates the plane of polarization of incident light through a given angle, whereas when this voltage difference is high, incident light is transmitted without rotating the plane of polarization. On the side of the liquid crystal cell. 60 from which the light is emitted, the analyzer 70 is provided. The analyzer 70 transmits only light of a particular plane of polarization. The plane of polarization of the light transmitted by this analyzer 70 is rotated from the plane of polarization of the light transmitted by the polarizer 50 by just the twist angle of the liquid crystal cell 60.

In this liquid crystal display device a pixel in the active state in the liquid crystal cell 60 has the plane of polarization of the incident light rotated through just the twist angle. The plane of polarization after rotation coincides with the plane of polarization which can pass through the analyzer 70. Thus, the incident light on the analyzer 70 passes through the analyzer. On the other hand, for an inactive pixel in the liquid crystal cell 60, the plane of polarization of the incident light is not rotated, and the light therefore impinges unchanged on the analyzer 70. Therefore, this light is unable to pass through the analyzer 70. In the present embodiment, the active state of a pixel is represented by the voltage difference between the transparent pixel electrodes and the transparent opposing electrodes being low, that is to say, a normally-white image display is effected.

Description of the Polarizing Apparatus

The polarizing apparatus 40 comprises an anisotropic optically active material. As such an optically active material may be cited polymers which are repeated units of the optically active molecules whose chemical formula is shown below.

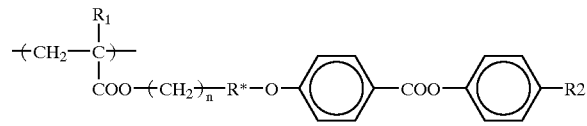

n=2, 3, 4, 5, 6
R* is

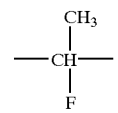

and represents the chiral center
R1 is H or $CH_3$
R2 is

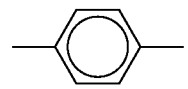

$OCH_3$ or $OCH_3$

The structural elements of the above chemical formula include rigid molecular portion in the side chains, and R* indicates the asymmetrical carbon atom that is, the chiral center. This chiral center R* is linked not only to the rigid molecular constituents, but also to substituents $(CH_2)_n$.

To the carbon atom at the chiral center R* are linked a rigid molecular portion, substituents $(CH_2)$, a methyl radical, and a fluorine atom, and their three-dimensional orientations are fixed for each of the optically active molecules, and form the basis of the stereo anisotropy.

In this embodiment, the polymer constituting the polarizing apparatus 40 is stretch-orientated. As a result, the optically active molecules have their rigid molecular portions and chiral centers R* substantially aligned in the same direction, and moreover the rigid molecular portions and the substituents $(CH_2)_n$ are aligned with a substantially fixed three-dimensional orientation.

Figure 1:
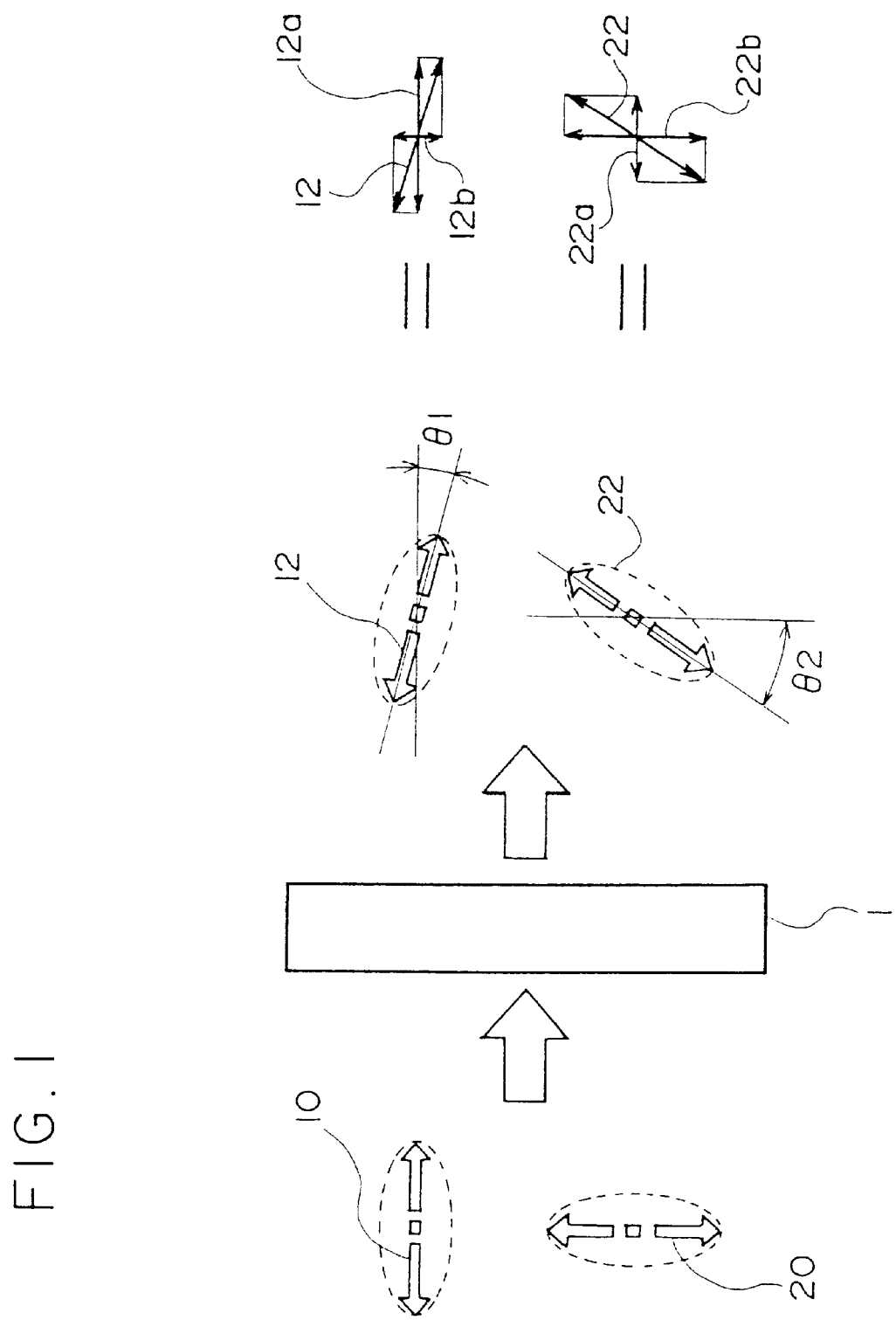
FIG. 1 is a schematic illustration of the anisotropy of the phenomenon of optical rotation of the optically active material of the present invention.

With this polarizing apparatus 40, as already described with reference to FIG. 1, the vector component of light having a particular plane of polarization is amplified, while the vector component of light having a plane of polarization perpendicular to the previous plane of polarization is reduced.

As a result, when light which has passed through this polarizing apparatus 40 impinges on the polarizer 50, only light having the particular plane of polarization is emitted with its intensity amplified, and the light passes through the polarizer 50 without reduction in the quantity of transmitted light to not more than 50% of the incident light which occurs with the use of the polarizer alone.

Figure 23:
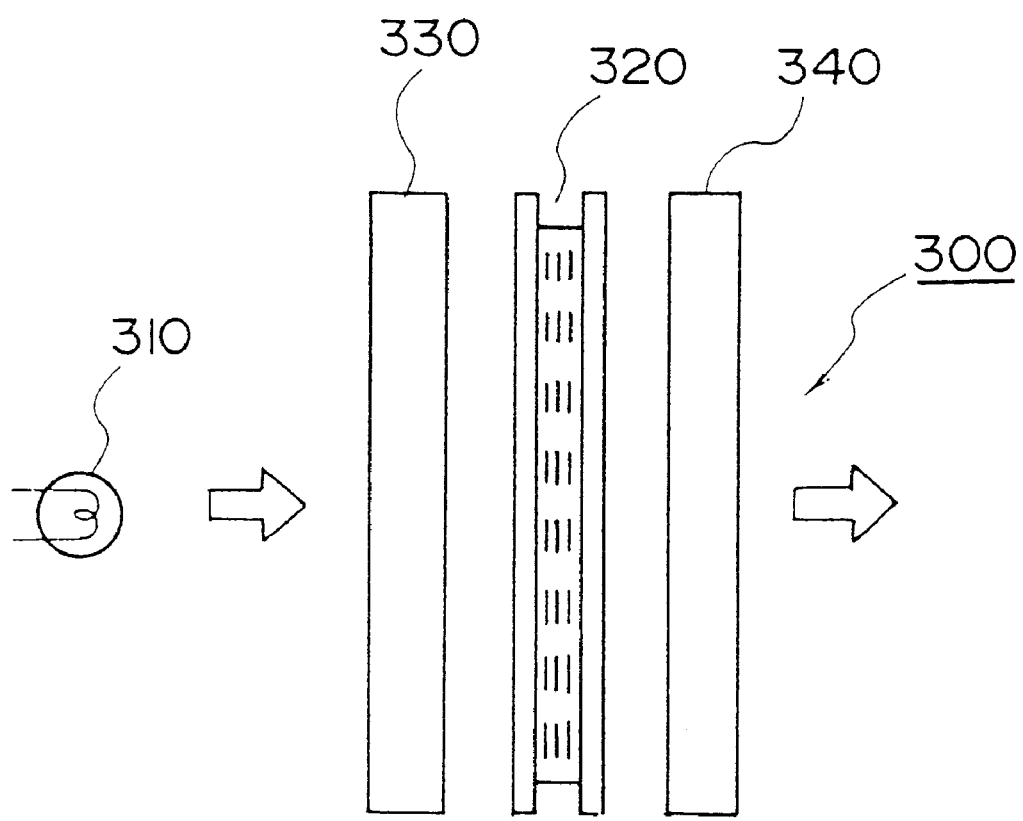
FIG. 23 is a schematic illustration of a conventional liquid crystal display device.

Compared with the prior art shown in FIG. 23, the amount of incident light on the liquid crystal cell. 60 is increased as the amount of light with particular plane of polarization is increased by rotating the plane of polarization by means of the polarizing apparatus 40.

In the liquid crystal cell 60, according to the drive state of the active elements disposed one for each pixel, the plane of polarization of the incident light is varied by means of the liquid crystal 66, and the emitted light from the liquid crystal cell 60 is output through the analyzer 70. Since this liquid crystal screen has the incident light on the liquid crystal cell 60 amplified compared with the conventional case, a brighter screen can be obtained. Alternatively, the backlight 30 can have a lower power consumption rating than conventional case, while maintaining at least the previous brightness, and as a result the power consumption of the liquid crystal display device can be significantly reduced. It is also possible to make the device more compact.

In this way, according to the first embodiment, since the amount of light absorbed and converted to heat by the polarizer is reduced, a brighter liquid crystal display can be achieved, or the power consumption of the backlight 30 can be greatly reduced, and it is also possible to make the device more compact. Further, since no heating of the liquid crystal cell, active elements, or other items by the polarizer occurs, stable performance can be obtained.

Second Embodiment

Figure 3:
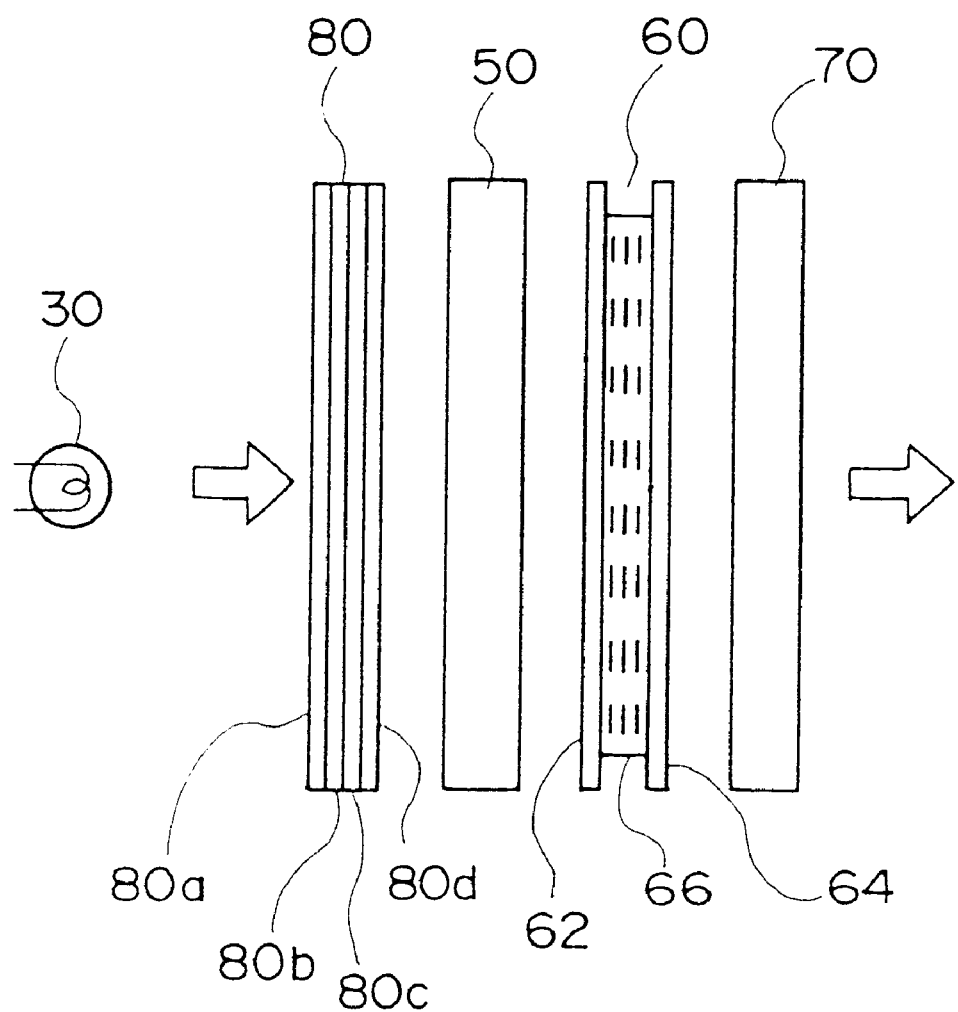
FIG. 3 is a schematic illustration of a liquid crystal display device, being a second embodiment of the optical transducer of the present invention.

The second embodiment differs from the first embodiment by replacing the polarizing apparatus 40 shown in FIG. 2 with a polarizing apparatus 80 formed from laminated polymer sheets 80*a* to 80*d*, as shown in FIG. 3.

The polymer sheets 80*a* to 80*d* are formed of a polymer with the same chemical constitution as in the first embodiment. As in the first embodiment the polymer is stretch-oriented, imparting an anisotropy to the optical activity of the polymer sheets. Here, the respective polymer sheets 80*a* to 80*d*, as in the case of FIG. 1, rotates light having a horizontal plane of polarization through a rotational angle θ1, and rotates light having a vertical plane of polarization through a rotational angle θ2 (>θ1).

The directions of stretch-orientation of the respective polymer sheets 80*a* to 80*d* can be arranged differently for each layer. Preferably, the directions of stretch-orientation of the polymer sheets 80*a* to 80*d* are arranged differently. In this way, it is possible to maximally amplify the polarized light component in the direction in which the elliptically polarized light component obtained by conversion in the previous layer is greatest by the polarizing conversion in the next layer.

Figure 4:
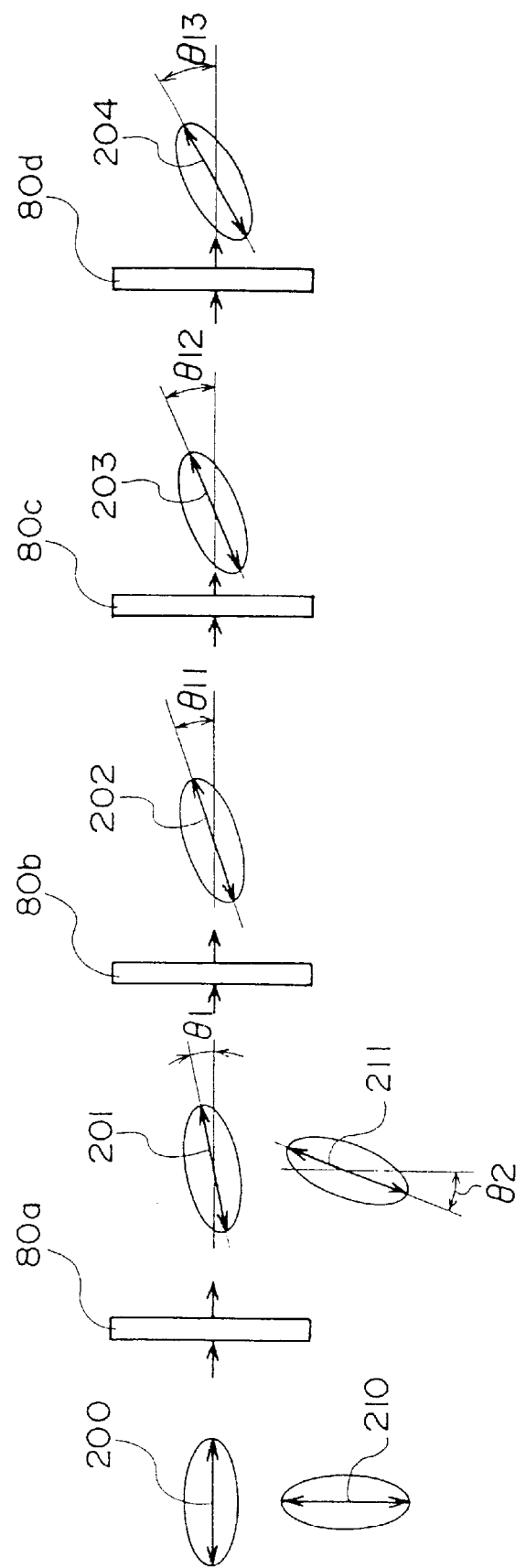
FIG. 4 is a schematic illustration of the optical rotation phenomenon of the layers of the multilayer optical transducer shown in FIG. 3.

This is now described with reference to FIG. 4. In FIG. 4, for explanatory convenience, the polymer sheets 80*a* to 80*d* are spatially separated, to show the state of the light to be subject to polarizing conversion by each polymer sheet.

Light which is to be resolved into a horizontal vector component 200 and a vertical vector component 210 impinges on the first polymer sheet 80*a*. With regard to the light passing through this first polymer sheet 80*a*, the horizontal vector component 200 having a horizontal plane of polarization is rotated through an angle of θ1 with respect to the horizontal plane, and as transmitted light, transmitted light 201 having a plane of polarization rotated through an angle of 81 with respect to the horizontal plane of polarization is obtained. Similarly, with regard to the light passing through this first polymer sheet 80*a*, the vertical vector component 210 having a vertical plane of polarization is rotated through an angle of θ with respect to the vertical plane, and as transmitted light, transmitted light 211 having a plane of polarization rotated through an angle of θ2 with respect to the vertical plane of polarization is obtained.

The plane of polarization to be most rotated by the second polymer sheet 80*b* is set to be rotated through an angle of θ1 with respect to the first polymer sheet 80*a*.

With regard to the third 80*c* and subsequent polymer sheets, the polymer sheets 80*c* and 80*d* have different directions of stretch-orientation, so that of the polarized light components in various orientations converted by the previous layer, the largest polarized light component in a particular orientation is amplified by the polarizing apparatus of the subsequent layer.

Hereafter, to describe only the polarizing conversion of the horizontal vector component having a horizontal plane of polarization. As light transmitted through the second polymer sheet 80*b*, the combined horizontal vector components of the transmitted light 201 and transmitted light 211 are rotated through a certain angel to obtain transmitted light 202 with the light of a particular plane of polarization amplified. Similarly, as light transmitted through the third polymer sheet 80*c*, the horizontal vector component of light transmitted through the second polymer sheet 80*b* is rotated through a certain angle to obtain transmitted light 203 with the light of a particular plane of polarization further amplified.

Finally, as light transmitted through the fourth polymer sheet 80*d*, the horizontal vector component of light transmitted through the third polymer sheet 80*c* is rotated through a certain angle, to obtain transmitted light 204 with the light of a particular plane of polarization further amplified. In the same way, as light transmitted through the fourth polymer sheet 80*d*, although not shown in the drawing, the vertical vector component of light transmitted through the third polymer sheet 80*c* is rotated through a certain angle to obtain transmitted light is obtained.

As a result, by passing through the first to fourth polymer sheets 80*a* to 80*d*, the light having a particular plane of polarization is amplified.

The plane of polarization of light passing through the polarizer 50 is aligned with the particular plane of polarization in which the amount of light has been amplified.

As a result, by the repeated light amplification in the plurality of polymer sheets, the light which has a plane of polarization being capable of passing through the polarizer 50 is amplified, and the light which has a plane of polarization being incapable of passing through the polarizer 50 is reduced. The present embodiment has been described with four layers, but in practice it will be necessary to determine the appropriate number of layers according to the magnitude of the anisotropy of the optical activity.

In this way, in the second embodiment again, since the amount of light absorbed and converted to heat by the polarizer is reduced, a brighter liquid crystal display can be achieved, or the power consumption of the backlight 30 can be greatly reduced. Further, since no heating of the liquid crystal cell, active elements, or other items by the polarizer occurs, stable performance can be obtained.

Third Embodiment

In the second embodiment, a plurality of successive optical rotations are used to achieve light amplification, using a laminated polymer sheet. In the third embodiment a optically active material is provided, having a given thickness in the direction of passage of the light, and having anisotropic in the direction of polarization. The given thickness in the direction of passage of the light is determined such that when natural light impinges thereon and passes through, light in a particular direction of polarization is amplified, while light orthogonal thereto is reduced. The structural elements of the above mentioned optically active materials have different three-dimensional orientation for each unit length region which is obtained by dividing the given thickness of the optically active material.

Preferably, with respect to the optically active materials in the unit length of the subsequent stages, the structural elements of optically active materials can have different three-dimensional orientation for each stage so that light having the plane of polarization most subject to polarizing conversion in the unit length of the previous stage can be maximally increased.

In this way, in this third embodiment again, since the amount of light absorbed and converted to heat by the polarizer is reduced, a brighter liquid crystal display can be achieved, or the power consumption of the backlight 30 can be greatly reduced. Further, since no heating of the liquid crystal cell, active elements, or other items by the polarizer occurs, stable performance can be obtained.

Fourth Embodiment

Figure 5:
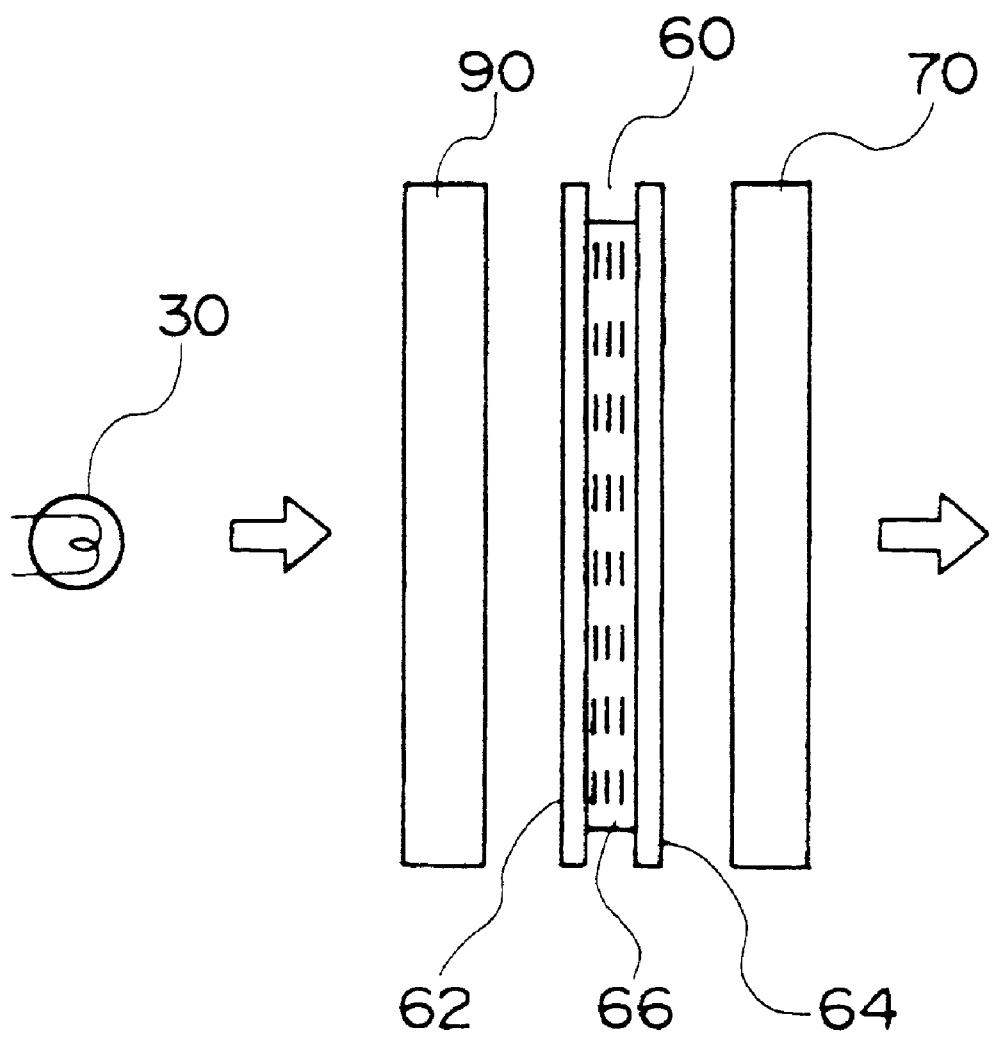
FIG. 5 is a schematic illustration of a liquid crystal display device, being a fourth embodiment of the optical transducer of the present invention.

The fourth embodiment, as shown in FIG. 5, has disposed in front of the liquid crystal cell 60, only a polarizer 90 formed from a polarizing apparatus.

As in the second and third embodiments, using either a laminated optically active material or a monolithic optically active material, a phenomenon of optical activity is repeatedly occurred. As a result, almost all of the light has the particular plane of polarization, and the light with other planes of polarization can be almost entirely eliminated. The polarizer 90 is constructed from an optically active material offering this multi-stage light rotation phenomenon. Together with this light amplification effect, the polarizer 90 can have the function of allowing only light of a particular plane of polarization to pass, which is the basic function of a polarizer.

In this way, in addition to the fact that the number of items of material can be reduced compared with the first to third embodiments, since the amount of light absorbed and converted to heat by the polarizer is reduced, a brighter liquid crystal display can be achieved, or the power consumption of the backlight 30 can be greatly reduced. Further, since no heating of the liquid crystal cell, active elements, or other items by the polarizer occurs, stable performance can be obtained.

Fifth Embodiment

Figure 6:
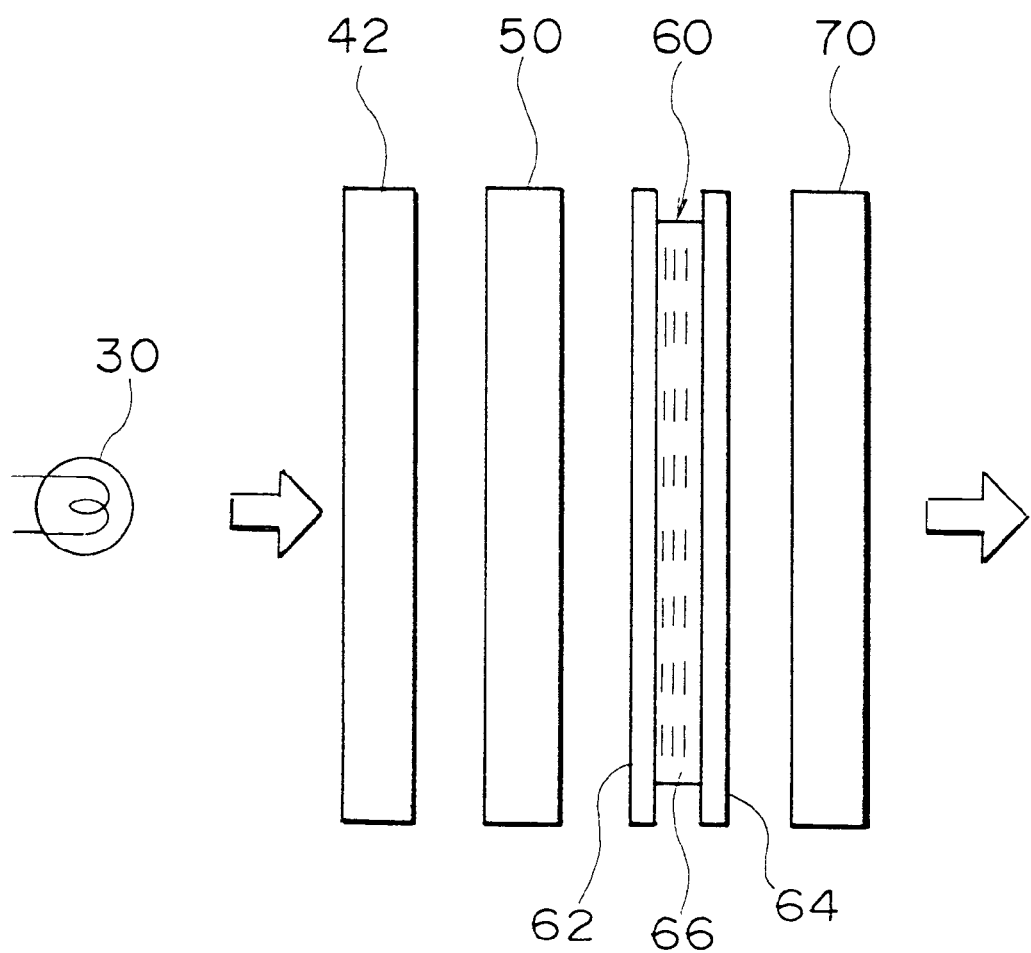
FIG. 6 is an overall structural view of a liquid crystal display device being a fifth embodiment of the present invention.

FIG. 6 is a schematic view of a liquid crystal display device using another polarizing apparatus of the present invention. The liquid crystal display device shown in FIG. 6 differs from the first embodiment in having the polarizing apparatus 40 of the liquid crystal display shown in FIG. 2 replaced by a polarizing apparatus 42.

The polarizing apparatus 42 of this embodiment is constructed with a base polymer mixed with an optically active material. Table 1 shows the combinations of base polymer composition and the mixed optically active materials.

TABLE 1

| Combined substance | Base polymer | Optically active |
|---|---|---|
| (Type 1) | | |
| Water-soluble base polymer + water-soluble optically active material | Polyvinyl alcohol, polyvinyl pyrollidone, or polyamino acid | Tartaric acid, lactic acid, tartrates, sugars, or amino acids |
| (Type 2) | | |
| Water-soluble base polymer + water-insoluble optically active material | As above | Chiral smectic C phase or I phase liquid crystal, quartz, or cinnabar crystals |
| (Type 3) | | |
| Organic solvent-soluble polymer + organic solvent-soluble optically active material | Polyvinyl acetate, polymethyl methacrylate, polyethyl methacrylate, epoxy resin, alkyd resin, urea resin, nitrocellulose, cellulose acetate, polyethylene terephthalate, nylon, phenol resin, phenol/resol resin, polyvinyl chloride, polyvinylidene chloride, vinyl chloride and vinyl acetate copolymer, or polystyrene or styrene/acrylonitrile copolymer | Chiral smectic C phase such as 8SI, 8SIO or I phase liquid crystals and liquid crystal composites, amino acid esters |
| (Type 4) | | |
| Organic solvent-soluble polymer + organic solvent-insoluble optically active material | As above | Quartz, cinnabar, lithium-potassium sulfate, sodium perchlorate or sodium bromate, sugars, or glycoprotein crystals |

It should be noted that the 8SI in Table 1 has the following formula (1):

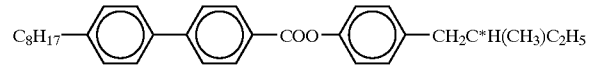

$$8SI*4\text{-}(2\text{-methylbutyl})phenyl\text{-}4'\text{-octylbiphenyl-4-caboxylate} \quad (1)$$

Moreover, the 8SI in Table 1 undergoes the following phase changes:

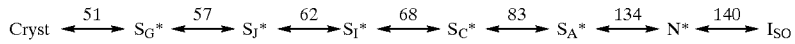

Moreover, the 8OSI in Table 1 has the following formula (2):

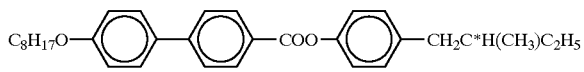

8OSI*4-(2-methylbutyl)phenyl-4'-octyloxybiphenyl-4-carboxylate(2)

And moreover, the 8OSI in Table 1 undergoes the following phase changes:

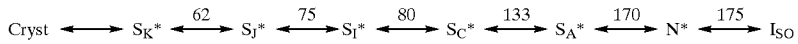

For types 3 and 4 in the above Table 1, the base polymer and optically active material are dissolved in an organic solvent. As possible organic solvents may be cited: methyl alcohol, acetone, methyl ethyl ketone, methyl isobutyl ketone, tetrahydrofuran, ethyl acetate, n-butyl acetate, isoamyl acetate, morpholine, pyridine, carbon tetrachloride, chloroform, ethylene dichloride, trichloroethylene, m-cresol benzene, toluene, ethyl benzene, xylene, chlorobenzen, hexane, cyclohexane, acetic acid, formic acid, and so on. For types 2 and 4 in Table 1, for example rod-shaped crystals having anisotropy in the crystalline form of the optically active material to be dispersed can be used, and by such use, the anisotropy of the optical rotation can easily be obtained.

Further, when the solubility OT the optically active material with respect to the base polymer is low, the optically active material is deposited at the removal of the solvent. Therefore even with the type 1 and 3 combinations, a formation that crystals of the optically active material is dispersed in the base polymer, as in types 2 and 4, is possible.

Principle of Polarizing Conversion

Next the principle of the polarizing apparatus is described. When a carbon atom within an optically active material is linked to four different atoms or radicals, the optically active materials in Table 1 above mostly have optical activity. This carbon atom is referred to as an asymmetric carbon atom. When linked to four different atoms or radicals, the molecule is not symmetrical, but is given a handedness. This property is termed chirality. When there is chirality, the asymmetric carbon atom is also termed the chiral center. A molecule which has chirality is one which exhibits optical activity.

Taking 8SI as shown in Table 1 above as an example, the asymmetric carbon atom C* has four atoms or radicals connected thereto, the radical extending from the $C_8H_{17}$ group to the asymmetric carbon atom, a hydrogen atom H, an ethyl radical $C_2H_5$, and a methyl radical $CH_3$, and possesses chirality. In this embodiment of the polarizing apparatus, by means of a manufacturing method described below, the principal connection direction of the rigid molecular portion from the $C_8H_{17}$ group to the asymmetric carbon atom is aligned in substantially the same direction, and the three-dimensional orientation of the substituents $CH_2$, $C_2H_5$, and H seen from the asymmetric carbon atom are aligned in substantially the same orientations.

In a molecule having optical rotation anisotropy in this way, the optical activity depends on the plane of polarization of the incident light. For example, as shown in FIG. 1 with a single molecule, the incident vector component 10 of light having a horizontal plane of polarization is rotated through an angle $\theta 1$, by means of the optically active molecule within the polarizing apparatus 42, with respect to the horizontal plane of polarization. The vector component 20 of the incident light having a vertical plane of polarization is rotated through an angle $\theta 2$, by means of the optically active molecule within the polarizing apparatus 42, with respect to the vertical plane of polarization. At this time, since the optical activity of the optically active molecule is anisotropic, the relationship between the angles of rotation is, for example, such that $\theta 1 < \theta 2$.

As a result, the incident light vector component 10 of light having a horizontal plane of polarization is rotated through an angle $\theta 1$, to become an emitted vector component 12.

On the other hand, the incident light vector component 20 of light having a vertical plane of polarization is rotated through an angle $\theta 2$, to become an emitting vector component 22. This emitted vector component 12 after rotation can be split into a horizontal vector component 12a and a vertical vector component 12b. Similarly the emitted vector component 22 after rotation can be split into a horizontal vector component 22a and a vertical vector component 22b.

Since the relationship $\theta 1 < \theta 2$ holds, when compared with the original incident vector component 10, the transmitted horizontal vector component 12a is hardly reduced from the horizontal vector component thereof, and a transmitted horizontal vector component 22a from the original incident vector component 20 is produced. In other words, the horizontal vector component being the sum of these two is considerably increased. On the other hand, when compared with the original incident vector component 20, the transmitted vertical vector component 22b is considerably reduced, and, the transmitted vertical vector component 12b from the original incident vector component 10 is hardly increased. In other words, the vertical vector component for the sum of these two is considerably reduced.

Therefore, the total horizontal vector component of the emitted light is larger than the total vertical vector component.

By adjusting the thickness in the advancing direction of light of the polarizing apparatus 42, both rotation angles can be adjusted. And by adding to light having a plane of polarization in one direction light having a plane of polarization orthogonal thereto which has been optically rotated, a considerably large emitted light amount can be obtained.

Method of Manufacturing the Polarizing Apparatus

Figure 7:
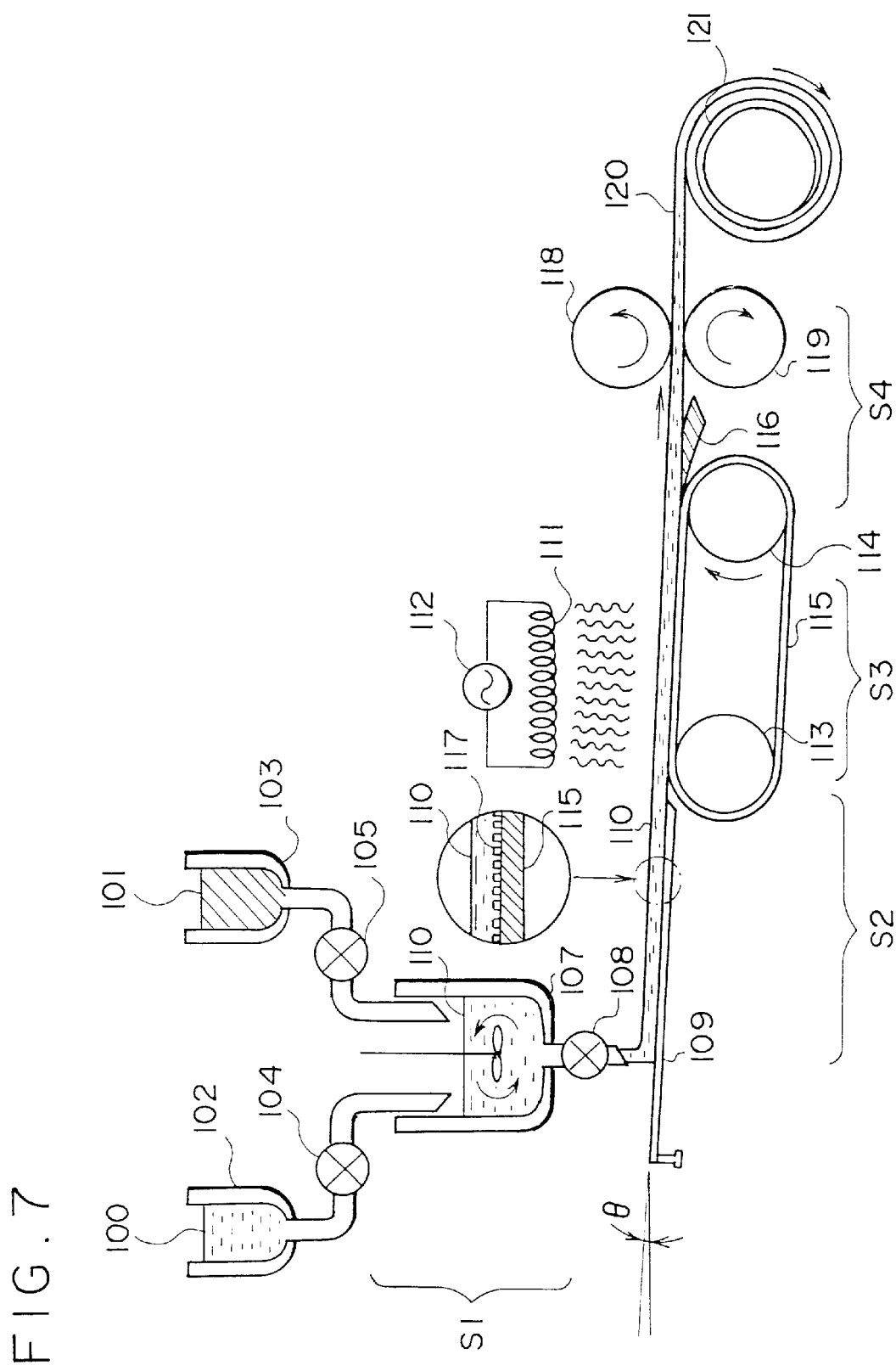
FIG. 7 is a structural illustration of a device for manufacturing the optical transducer of the fifth embodiment.

In FIG. 7, the manufacturing device of the present embodiment is shown, partly in section. This manufacturing device comprises a base polymer container 102, an optically active material container 103, a mixing container 107, a casting board 109, a drying heater 111, a power supply 112, drive rollers 113 and 114, a conveyer belt 115, a blade 116, stretching rollers 118 and 119, and a take-up roller 121.

Mixing stage (S1): A base polymer 100 listed in Table 1 is put in the base polymer container 102 and an optically active material 101 listed in Table 1 is put in the optically active material container 103. The amount of base polymer mixed is controlled by adjusting a valve 104, and the amount of optically active material mixed is controlled by adjusting a valve 105. The base polymer and optically active material are mixed in the mixing container 107, forming a combined solution 110.

Casting stage (S2): The combined solution 110 has its flow rate controlled by a valve 108, and is poured onto a casting belt. The casting board 109 is inclined at a very small angle to the horizontal, and as a result the combined solution 110 flows slowly, and spreads out to form a film.

The casting board 109 has fine grooves 117 formed in its longitudinal direction, and as the combined solution 110 flows over these grooves, orientation of the optically active molecules of the optically active material 101 become aligned. That is to say, in the optically active molecules, since the asymmetric carbon atom has a rigid linear chain portion of high molecular weight, as the optically active material flows over the horizontal plane the optically active molecules are naturally aligned in the orientation of least resistance. This is termed the flow orientation. When grooves are provided in the direction of flow along the flow surface, this assists the molecular formation effect. At this time, when the combined solution is in the liquid crystal phase, or when the mixture (dispersion) has anisotropy in the suspended crystals (for example, with rod-shaped crystals), then the orientation due to the flow orientation and formation effect is enhanced.

Drying stage (S3): Since the drying heater 111 has a power supply 112 connected, the combined solution 110 spreading out into a film is heated, the solvent evaporates, and the film is dried. By this means, the combined solution 110 which was liquid becomes solid, turning into a film. The conveyer belt 115 transports the combined solution 110 which has begun to solidify at the same speed as the flow of the combined solution 110 over the casting board 109.

Stretching stage (S4): The film 120 formed by drying and solidification of the combined solution 110 is removed by a blade 116, and stretched to a fixed tension by stretching rollers 118 and 119. The optically active molecule orientation created to a certain extent by the casting stage is enhanced by this stretching. The film 120 of enhanced molecular orientation is then wound on a take-up roller 121. The thickness of the film is controlled by the gap between the stretching rollers 118 and 119.

The film 120 manufactured by the above stages exhibits optical activity in a direction perpendicular to the molecular orientation, that is with respect to light passing through the film in the thickness direction. When the anisotropy of the optical rotation angle required for the polarizing apparatus cannot be obtained within the thickness of the film, a number of layers of the film may be laminated to ensure the required optical activity. By cutting the laminated film to a given size, a polarizing apparatus 1 is obtained. When the film is laminated, it is preferable for the orientation of the optically active material to be varied from layer to layer. For example, in the case as shown in FIG. 2, one layer of the optically active material has an optical rotation angle of θ1 with respect to light having a horizontal plane of polarization, the direction of stretching orientation of the optically active material should be varied so that the plane of polarization giving the maximum angle of optical rotation is progressively changing through the angle θ1 for each layer starting from the light incident side.

It should be noted that in the above manufacturing device, as long as the method of mixing, the method of casting, the method of drying, and the method of stretching are such that the liquid mixture of the base polymer and the optically active material are solidified to form a film and stretched, any known methods other than those in the embodiment above may be applied.

In the construction of a liquid crystal display device shown in FIG. 6, the polarizer 50 can be omitted. That is to say, by using either a single piece of optically active material or a laminated film of optically active material for repeated optical rotation, almost all of the light can be given the particular plane of polarization, and the light having the other plane of polarization can be almost entirely eliminated. This is because, in addition to the effect of amplifying the light by means of optical rotation of light having the other plane of polarization, such a polarizing apparatus also has the function of acting as a polarizer, allowing only light of the particular plane of polarization to pass.

As described above, according to the fifth embodiment, by combining the optically active material with the base polymer, forming a film, and drying and stretching, a polarizing apparatus with the optically active molecules aligned can be manufactured. By using the combinations of base polymer and optically active material shown in Table 1, this polarizing apparatus exhibits anisotropy of optical activity with respect to incident light.

Sixth Embodiment

In the sixth embodiment of the present invention, in place of the solidified optically active material in the fifth embodiment above, a polarizing apparatus is provided using a liquid optically active material.

Figure 8:
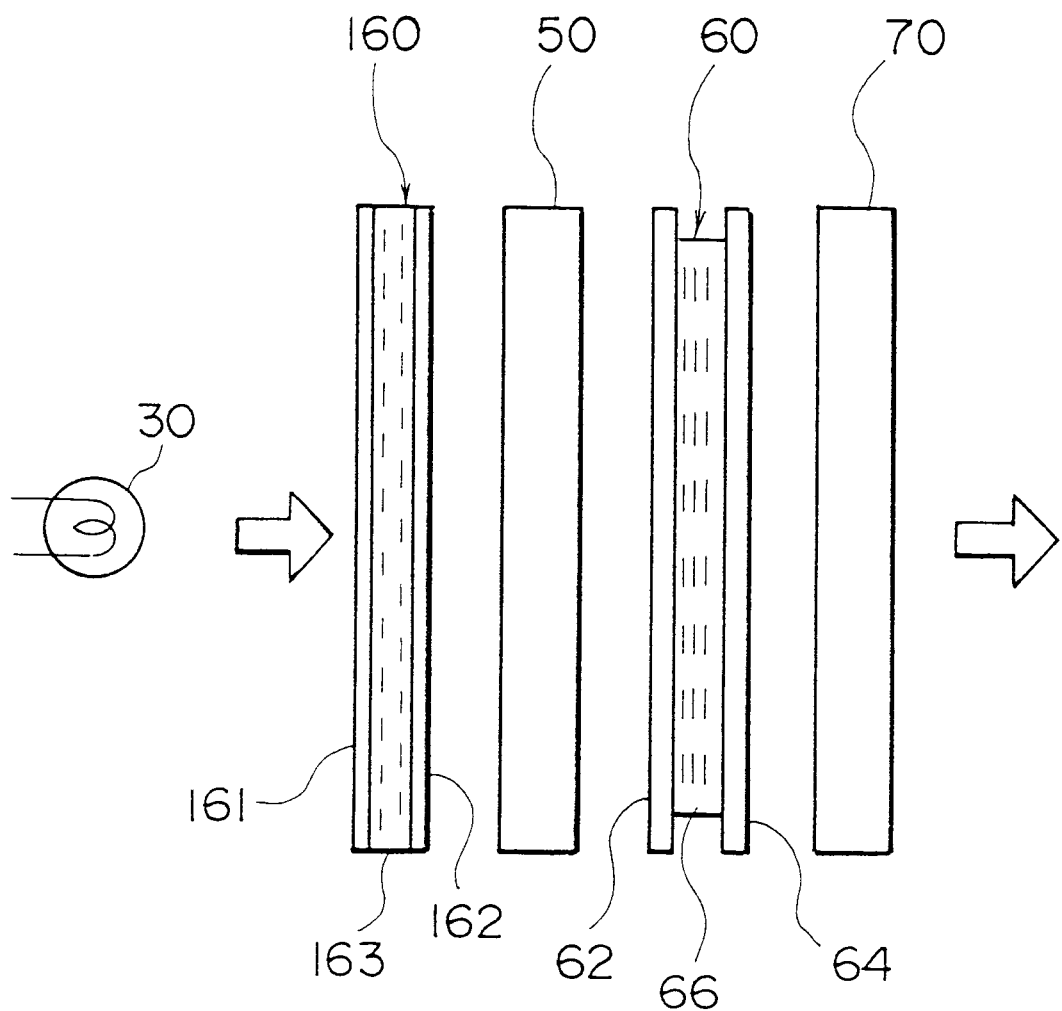
FIG. 8 is an overall structural view of a liquid crystal display device being a sixth embodiment of the present invention.

FIG. 8 is an overall structural view of the sixth embodiment of the liquid crystal display device. This sixth embodiment differs from the fifth embodiment only in that the polarizing apparatus 42 of FIG. 6 is replaced by a polarizing to apparatus 160 of this embodiment.

The polarizing apparatus 160 of this embodiment comprises transparent plates 161 and 162 which sandwich an optically active material 163.

As the transparent plates 161 and 162 may be used various glass plates, plastic plates, or other material of high transparency.

Figure 9:
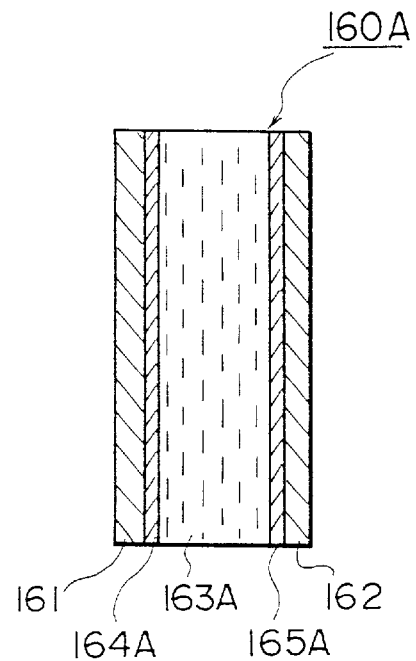
FIG. 9 is a sectional view of the polarizing apparatus resulting from the rubbing method of the sixth embodiment.
Figure 10:
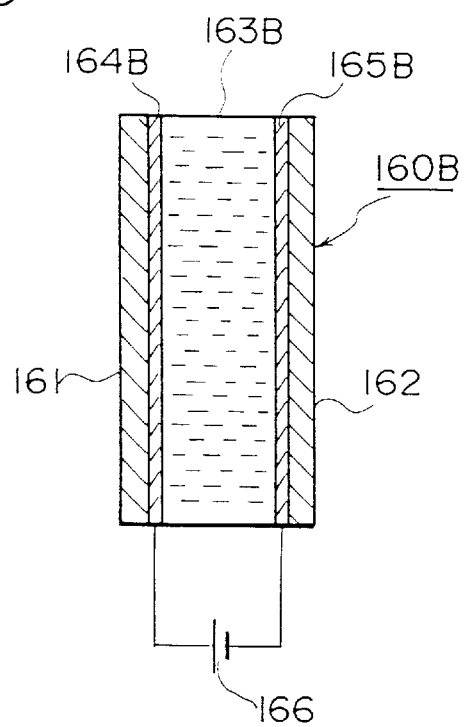
FIG. 10 is a sectional view of the polarizing apparatus resulting from the method of applying an electric field of the sixth embodiment.

The polarizing apparatus 160 may employ the rubbing method using an oriented film as shown in FIG. 9, or the method of applying electric field which applies voltage as shown in FIG. 10. First a polarizing apparatus 160A using the rubbing method as shown in FIG. 9 is described. Firstly, a film of a macromolecular substance such as a sugar which exhibits optical activity is painted on the inner surfaces of the transparent plates 161 and 162, then the surfaces which the optically active material contacts are rubbed in a particular direction to create oriented films 164A and 165A. In general, it is known that when the surface of a macromolecular film is rubbed in a particular direction (rubbing direction), aligning the molecular axes of the molecules in this direction, then molecules in contact with the macromolecular film also align themselves with this rubbing direction. If the angle between the orientation direction of the oriented film 164A and the orientation direction of the oriented film 165A is arranged to coincide with the angle through which rotation is finally desired, then the maximum amount of light with a particular plane of polarization can be obtained. The direction of the molecular axis orientation of the optically active molecules obtained by the rubbing method is substantially parallel to the transparent plates.

As compositions for the oriented films 164A and 165A may be cited both polymers which do and which do not exhibit optical activity, for example: soluble cellulose, polyethylene, polyvinyl alcohol, nylon 66, nylon 6TPA, polybutylene terephthalate, polyethylene terephthalate, polyester, polyimide, parylene polyparaxylene, polycyclohexyl methacrylate, cross-linked nylon, polyvinyl methyl ketone, polyacetal, polybenzyl, and methacrylate.

When rubbing method is used, as the optically active material 163A may be cited the sugars, amino acids, and liquid crystals and liquid crystal compositions such as the substances of composition (1) or (2) above exhibiting optical activity, as shown in Table 1.

Next a polarizing apparatus 160B using the method of applying an electric field as shown in FIG. 10 is described. In this polarizing apparatus, on the opposing surfaces of the transparent plates 161 and 162 are formed transparent electrodes 164B and 165B. The interval between the transparent electrodes is filled with an optically active material 163w formed from liquid crystal molecules.

The transparent electrodes 164B and 165B are formed from a film of, for example, indium tin oxide (ITO). The optically active material 163B should be one which has orientation with respect to an electric field. For example, they may preferably be a ferroelectric liquid crystal such as chiral smectic C (Sm*C) or chiral smectic I (Sm*I). A predetermined voltage is applied between the transparent electrodes from a power supply 166.

In the method of applying an electric field, because of the liquid crystal properties of the optically active material, direction of the molecular axis orientation of the optically active molecules varies. For example, when the liquid crystal is in the nematic phase and is exhibiting a dehomeotropic orientation, or when in the smectic phase for a material in which the orientation is perpendicular to the substrates, as shown in FIG. 10, the molecular axes of the liquid crystal molecules are substantially perpendicular to the transparent plates. On the other hand, when the liquid crystal is in the nematic phase and is exhibiting a homogeneous orientation, or when in the smectic phase for a material in which the orientation is parallel to the substrates, the molecular axes of the liquid crystal molecules are substantially parallel to the transparent plates.

It should be noted that the method of controlling the orientation of the optically active material is not restricted to the above, and an, known method may be applied. For example, the shear stress method, the thermal gradient method, or the SiO2 tilted angle evaporation may be used.

Furthermore, as the optically active material described above may be used not necessarily a single optically active material, but also a combined solution of a plurality of optically active materials. Furthermore, a liquid including a dispersion of fine crystalline particles may also be used. As described above, according to the sixth embodiment, two transparent plates may confine a liquid optically active material therebetween to provide a polarizing apparatus having the same optical activity effect as in the fifth embodiment above.

Seventh Embodiment

The eighth embodiment provides, in the fifth embodiment described above, a combination of base polymer and optically active material which secure the optical activity.

In this embodiment, as the base polymer (see Table 1) of the fifth embodiment above is used a material with optical activity. As a base polymer with optical activity may be considered, if a water-soluble base polymer, polyamino acid, polysaccharides, glycoproteins, and their derivatives, and if an organic solvent-soluble base polymer, a polyester type macromolecular liquid crystal in which the monomer (monomolecular structure) has a chiral center (for example the macromolecular composition shown in (3) below).

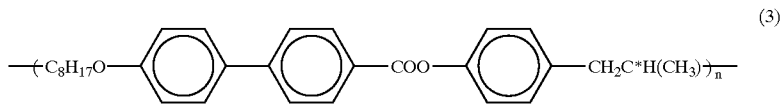

(3)

If the base polymer exhibits optical activity, then in the casting stage (FIG. 7: S2), the molecular axes of the optical active molecules forming the base polymer are also oriented, and emitted light which exhibits anisotropy of polarization with respect to the incident light can be obtained. The light impinging on such a polarizing apparatus is not only optically rotated by the optically active material combined with the base polymer, but is also optically rotated by the optically active molecules forming the base polymer itself.

As a result, compared with the case in which only the optically active material optically rotates the incident light, even more optical rotation can be applied to the incident light.

Compensation of Optical Activity

Furthermore, it is preferable for the optical activity of the base polymer to have wavelength distribution characteristics such as to compensate for the variations in optical activity of the optically active material with the wavelength (that is, the wavelength distribution characteristics of the optical rotation). This is now described with reference to FIGS. 11 to 13.

Figure 11:
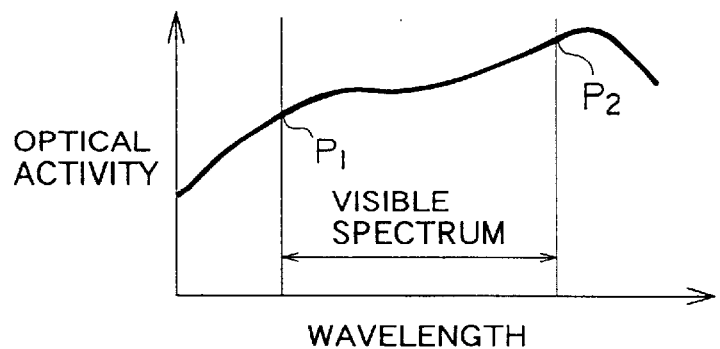
FIG. 11 illustrates example wavelength distribution characteristics of the optical rotation of an optically active material.

FIG. 11 shows the wavelength distribution characteristics of the optical rotation of the optically active material itself. As shown in this figure, an ordinary optically active material has variations in the optical activity (magnitude of the optical rotation angle, and the like) even over the wavelength range of visible light. For example, there is a large difference between the optical activity P1 in a short wavelength portion, and the optical activity P2 in a long wavelength portion in the visible spectrum. For a polarizing apparatus using an optically active material which has such wavelength distribution characteristics, at one wavelength the optical rotation angle is large, and thus light at this wavelength is amplified. At other wavelengths the rotation angle is small, and there is the problem that light at these other wavelengths is no$^+$ greatly amplified. Since this results in the light amount being increased only at a particular wavelength, it may be considered that the light emitted from the polarizing apparatus is tinged with a color.

At this end, in the present embodiment, a material having wavelength distribution characteristics which compensates for the wavelength distribution characteristics of the optically active material is used as the base polymer or a material included in the base polymer.

Figure 12:
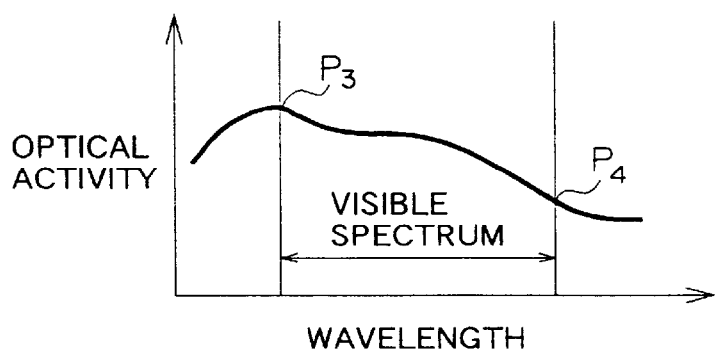
FIG. 12 illustrates example wavelength distribution characteristics for compensate the wavelength distribution characteristics of the optical rotation of the optically active material shown in FIG. 11.
Figure 13:
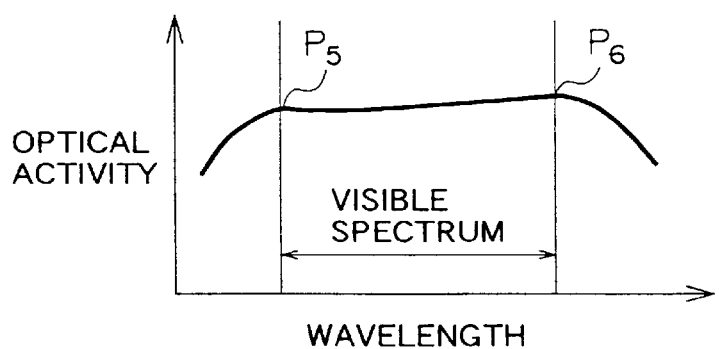
FIG. 13 illustrates the wavelength distribution characteristics in the case that an optically active material having the wavelength distribution characteristics shown in FIG. 11 is mixed with an optically active material having the wavelength distribution characteristics shown in FIG. 12.

For example, in the case that the optically active material exhibits the wavelength distribution characteristics shown in FIG. 11, a base polymer with the wavelength distribution characteristics shown in FIG. 12 is used, or a substance with such wavelength distribution characteristics is included in the base polymer. In FIG. 12, the optical activity P3 at short wavelengths is high, and the optical activity P4 at long wavelengths is low, so that the wavelength distribution characteristics in the visible spectrum vary in a way opposite to the wavelength distribution characteristics shown in FIG. 11. If the mixture is such that there are approximately equal numbers of both molecules, then the optical activity of the optically active material and the optical activity of the base polymer or the optically active material included in the base polymer are added together, and as shown in FIG. 13, an averaged optical activity over the visible spectrum is exhibited. As shown in FIG. 13, the optical activity P5 at short wavelengths and the optical activity P6 at long wavelengths are approximately equal.

As such a combination of base polymer and optically active material allowing optical activity compensation to be carried out may be cited for example the combination in which the base polymer is a polyamino acid and the optically active material is a sugar.

It should be noted that in the above embodiment it is either the base polymer itself or a substance included in the base polymer has optical activity which compensates the wavelength distribution characteristics of the optically active material, however, even if the base polymer is not given optical activity, the same effect may be obtained through the use of a plurality of optically active materials. That is to say, by selecting one optically active material such that its wavelength distribution characteristics compensate the wavelength distribution characteristics of the other optically active material, uniform wavelength distribution characteristics can be obtained for the polarizing apparatus.

As optically active materials providing mutual compensation of optical activity may be cited combinations of amino acids and sugars.

Thus according to the seventh embodiment, since optical activity is imparted to the base polymer itself or to a substance included in the base polymer, a polarizing apparatus with more powerful optical activity can be provided. Additionally, if the base polymer itself or a substance included in the base polymer has wavelength distribution characteristics which compensate the wavelength distribution characteristics of the optical activity of the optically active material, then a polarizing apparatus with even wavelength distribution characteristics, and with no color tinge can be provided.

It should be noted that a liquid crystal display device which is an optical transducer and uses the polarizing apparatus of the present invention as a polarizer, is not restricted to a backlit type (transmitting type) as described above, but may be a reflective type of liquid crystal display device. In this case, the polarizing apparatus may be disposed in front of the light incident side of the liquid crystal cell.

Additionally, a liquid crystal display device being an optical transducer using the polarizing apparatus of the present invention is not restricted to a particular type of liquid crystal or of drive method, but can be used in various liquid crystal display devices which conventionally have used a polarizer.

Furthermore, the polarizing apparatus of the present invention is not restricted to being used in a liquid crystal display device, but may be used in a variety of devices using a polarized luminous flux having a particular plane to polarization, including for example a liquid crystal light valve for a projector, an optical analyzer, or as various polarizer for a liquid crystal display device.

Eighth Embodiment

Next, as a eighth embodiment of the present invention, various examples of electronic devices using a liquid crystal display device being the above described optical transducer are described with reference to FIGS. 14 to 22.

Figure 14:
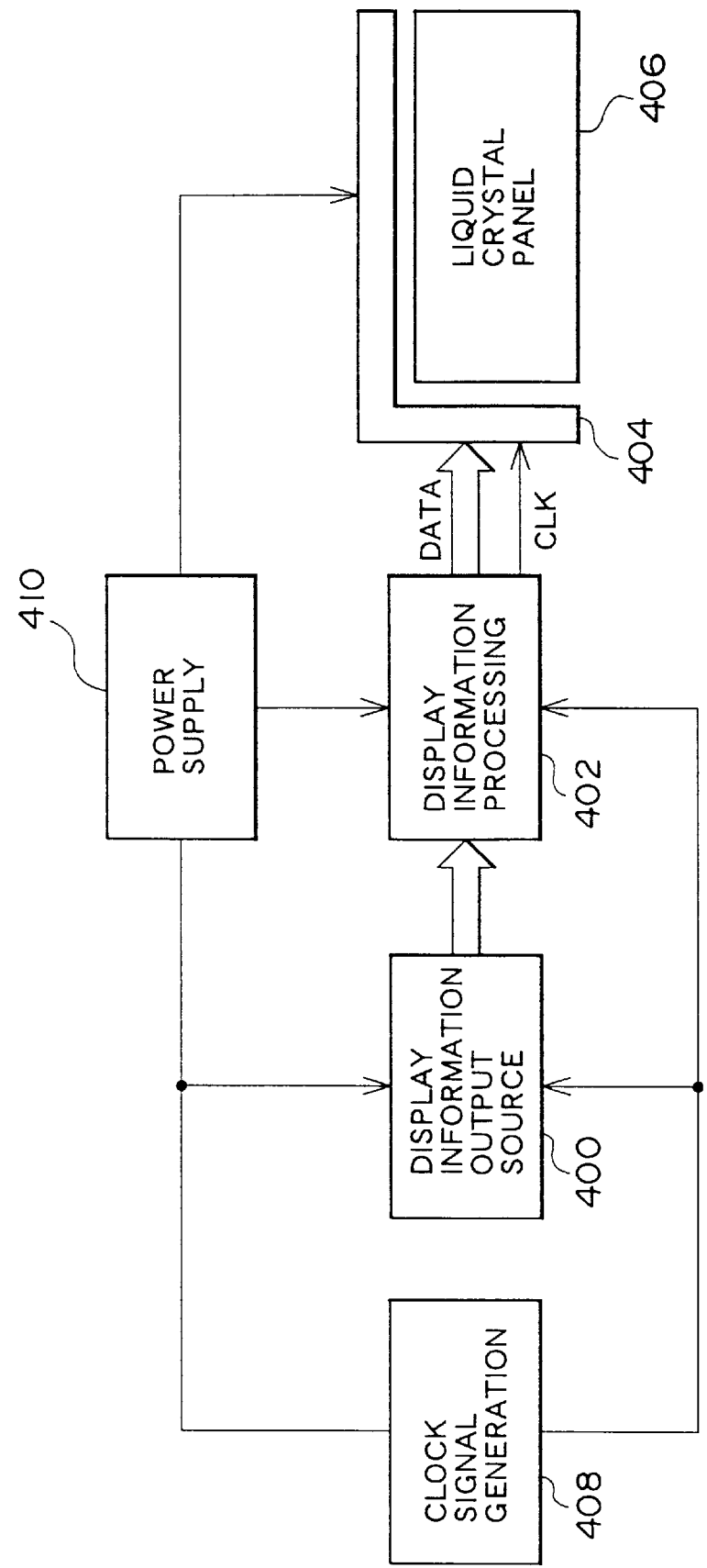
FIG. 14 is a block diagram of the schematic electrical construction of an electronic device using the liquid crystal display device, being an optical transducer of the seventh embodiment of the present invention.

First, with reference to FIG. 14, the general construction of electrical circuit of such an electronic device is described. This electronic device, as shown in FIG. 14, comprises a display information output source 400 for outputting display information, a display information processing circuit 402 for processing the display information, a display drive circuit 404 for driving the display, an optical switch 406 constituted by a liquid crystal panel or the like, a clock signal generation circuit 408 for generating a clock signal, and a power supply 410.

Herein, the display information output source 400 is constructed to include memory such as ROM, RAM, and a synchronizing circuit outputting in synchronization with a television signal. By this means, the display information output source 400 responds to a clock signal output from the clock signal generation circuit 408, and outputs display information such as a video signal to the display information processing circuit 402. The display information processing circuit 402 is constructed comprising for example amplifier and polarity inversion circuits, phase development circuits, rotation circuits, gamma correction circuits, clamp circuits, and the like. By this means, the display information processing circuit 402 processes display information while it is synchronizing to clock signals output from the clock signal generation circuit 408, and outputs the processed information to the display drive circuit 404. The display drive circuit 404 is constructed with scan drive circuits and data drive circuits, and drives the optical switch 406 to display information. The power supply 410 supplies power to the circuits and elements within the device.

Description of the Liquid Crystal Projector

Figure 15:
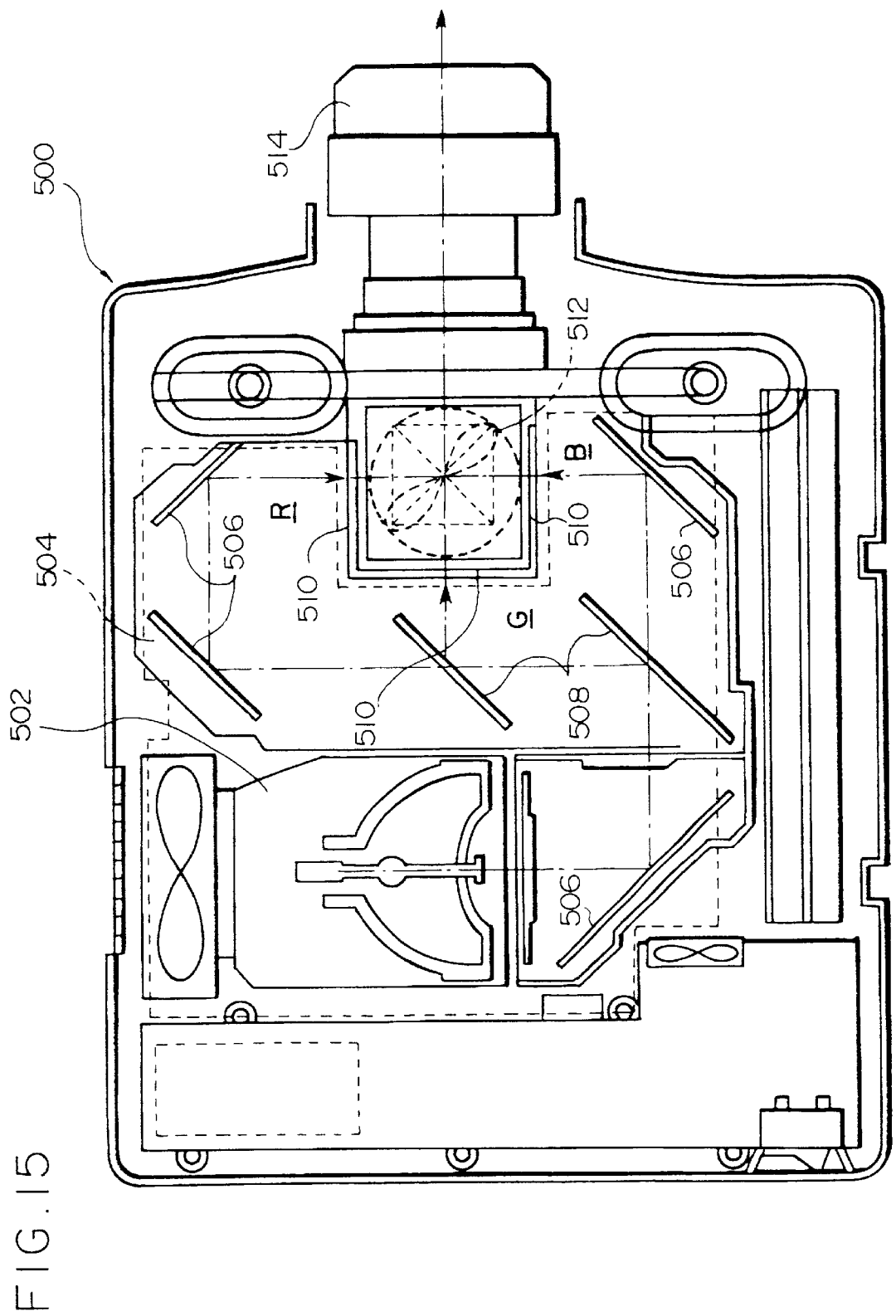
FIG. 15 is a schematic plan view of a projector, being an electronic device pertaining to a first example of the eighth embodiment of the present invention.

As a first example of an electronic device having the above circuit construction, in FIG. 15, a liquid crystal projector is shown.

This liquid crystal projector is a projection-type liquid crystal projector, using a transmitting liquid crystal panel is as a light valve. This projector, as one example, uses a three-prism optical system. The projector 500 shown in FIG. 15 is provided with a lamp unit 502 being a white light source. Projection light emitted from the lamp unit 502 is guided to a light guide 504, wherein the light is divided into the primary colors red, green, and blue by a plurality of mirrors 506 and two dichroics 508. The primary light colors are guided through optical switches 510R, 510G, and 510B which use three liquid crystal panels for image display of the respective colors, and are modulated according to the display information.

Each of the three optical switches 510R, 510G, and 510B is constructed as the transmitting optical transducer of the present invention. That is to say, as shown in FIGS. 2, 3, 6, and 8, these optical switches are constructed with, in order from the direction of incident light, a polarizing apparatus, a polarizer, a liquid crystal cell, and an analyzer; or as shown in FIG. 5, with, in order from the direction of incident light, a polarizing apparatus (also serving as a polarizer), a liquid crystal cell, and an analyzer. Alternatively, the polarizing apparatus (and further if necessary polarizer) may be disposed immediately after the lamp unit. By this means the required number of polarizing apparatus is reduced, and the optical design is simplified, allowing both high reliability and low cost to be achieved.

The three primary light colors red, green, and blue modulated by the three optical switches 510R, 510G, and 510B, as shown in FIG. 15, impinge on a dichroic prism 512 from three directions. The dichroic prism 512 bends the red (R)

and blue (B) light through 90 degrees, while allowing the green (G) light to pass straight through, and thus synthesizes the three color images. The synthesized image light passes through a projection lens 514 to be projected on an object on which the projection is carried out such as a screen. By this means a projected color image of the display information is obtained.

Description of the Personal Computer

Figure 16:
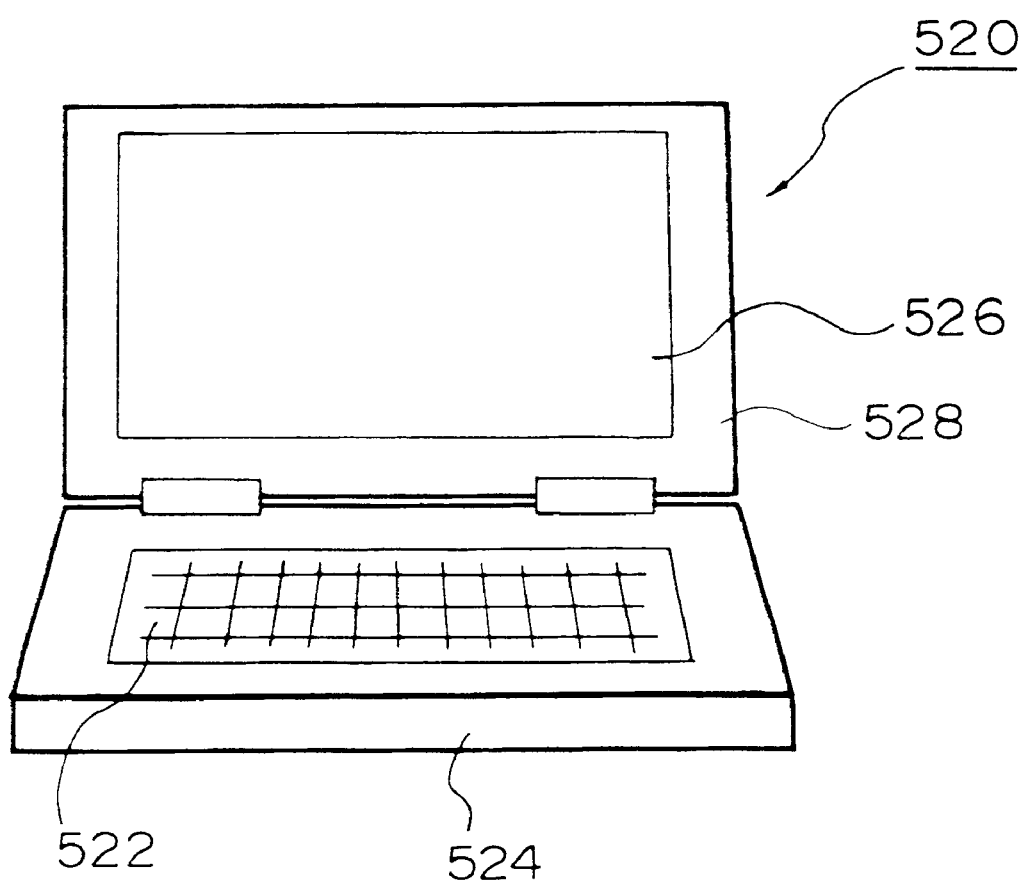
FIG. 16 is a schematic view of a personal computer or engineering workstation (EWS), being an electronic device pertaining to a second example of the eighth embodiment of the present invention.

As a second example of the electronic device, in FIG. 16, a personal computer with multimedia support, or an engineering workstation (EWS) is shown.

This is now described in terms of a personal computer. The personal computer 520 has a body 524 provided with a keyboard 522, and a display section 528 provided with a liquid crystal display screen 526. Here, the transmitting liquid crystal panel forming the liquid crystal display screen 526 is implemented as the optical transducer of the present invention described above.

Description of the Pager

Figure 17:
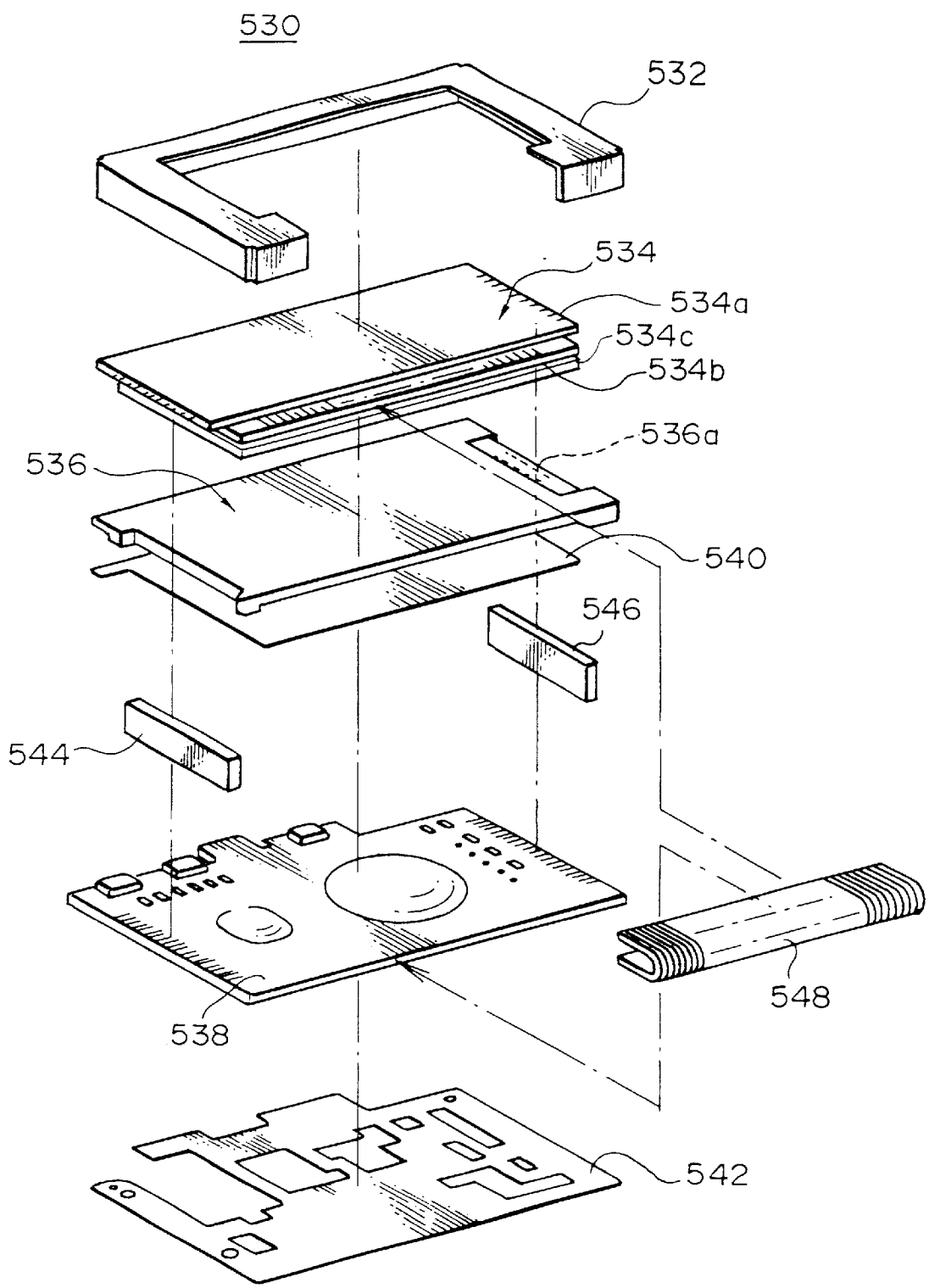
FIG. 17 is a schematic view of a pager, being an electronic device pertaining to a third example of the eighth embodiment of the present invention.

As a third example of the electronic device, in FIG. 17, a pager is shown. It should be noted that in place of the pager may be cited a portable telephone, a word processor, a television, a viewfinder type or direct view monitor type of video tape recorder, a digital camera, an electronic notebook, an electronic calculator, a car navigation device, a POS terminal, or a device provided with a touch panel, or other devices.

As the third example, a pager is now described, as representative of these devices. The pager 530 shown in FIG. 17 is provided with a metal frame 532, and within this frame a liquid crystal display panel 534, a light guide 536 provided with a backlight 536*a*, a circuit board 538, first and second shield plates 540 and 542, two resilient conductors 544 and 546, and a film carrier tape 548. The resilient conductors 544 and 546 and the film carrier tape 548 are provided to mutually connect the liquid crystal display panel 534 and circuit board 538.

The liquid crystal display panel 534 is an example of the optical transducer of the present invention. This liquid crystal display panel 534 is provided with for example two transparent plates 524*a* and 534*b* and a polarizing apparatus 534*c* (also serving as a polarizer). The transparent plates 534*a* and 534*b* have sealed therebetween a liquid crystal, and thereby at least a dot-matrix type of liquid crystal display panel (optical switch) is formed. The polarizing apparatus 534*c* is disposed on the side of the liquid crystal display panel 534 on which light enters. The polarizing apparatus 534*c* may be adhered to the liquid crystal display panel, if necessary.

One of the two transparent plates 534*a* and 534*b* may have formed thereon the display drive circuit 404 shown in FIG. 14, or additionally a display information processing circuit 402. Circuit not formed on the transparent plates 534*a* and 534*b* is constructed as an external circuit. In the case of the pager shown in FIG. 17, the external circuit can be implemented on is the circuit board 538.

In the case of the pager shown in FIG. 17, in addition to the liquid crystal display panel 534, a circuit board 538 is required. However, when the optical transducer is being used as one component of an electronic device, and the display drive circuit and the like can be mounted on the transparent plates, the minimum structural configuration of the optical transducer is the liquid crystal display panel 534.

In another aspect of the optical transducer of the present invention, the liquid crystal display panel 534 may be constructed as an element fixed to the metal frame 532 which is formed as a housing, and this element may be incorporated as a component in an electronic device. In a further aspect, in the case of a backlit type, the optical transducer of the present invention may be constructed with the liquid crystal display panel 534 and the light guide 536 provided with the backlight 536*a* integrally incorporated within the metal frame 532.

Figure 18:
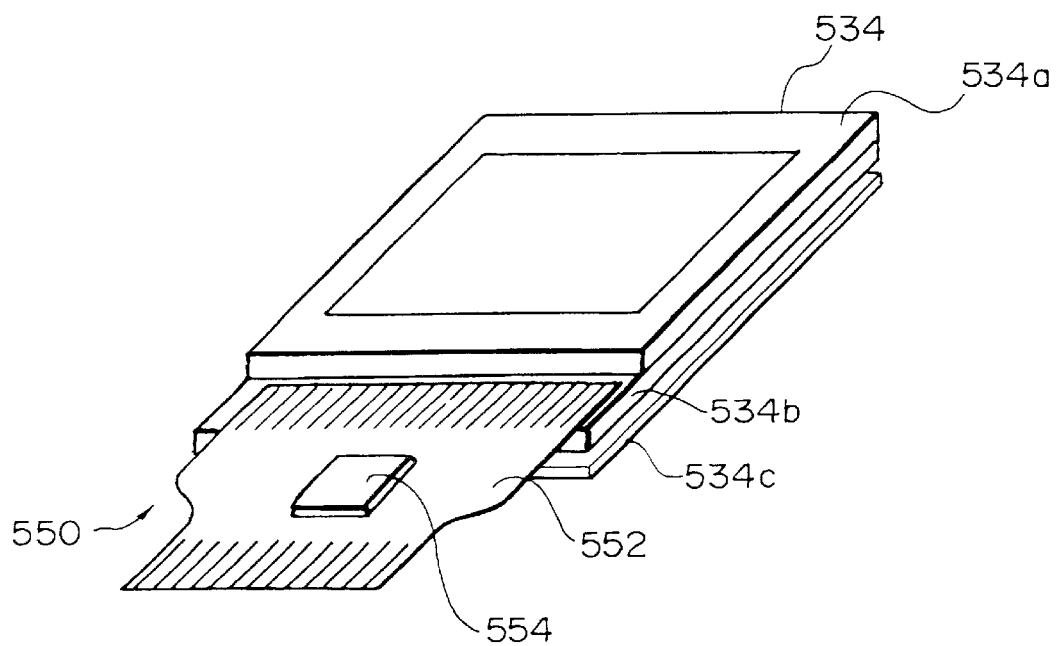
FIG. 18 illustrates a modification of the third example of the eighth embodiment of the present invention.

Furthermore, in place of these constructions described above, for the optical transducer being a component in the electronic device, a tape carrier package (TCP) may be employed. That is to say, as shown in FIG. 18, a TCP 550 is provided, in which a polyimide tape 552 on which is provided a metal conducting film has an IC chip 544 mounted thereon. This TCP is connected to one of the two transparent plates 534*a* and 534*b* of the liquid crystal display panel 534, and can be used as an optical transducer.

As above, the various electronic devices of this eighth embodiment incorporate an optical transducer provided with a polarizing apparatus according to the present invention in an appropriate aspect. For this reason, in the same way as in the previous embodiments, since the amount of light with a particular plane of polarization impinging on the liquid crystal cell (liquid crystal panel) can be increased, when the amount of light of the light source is unchanged a brighter display image than conventional way can be obtained. On the other hand, even if the amount of light from the light source is reduced, an image of the same brightness as conventional way can be obtained. Therefore the overall power consumption of the electronic device can be greatly reduced, and power savings can be obtained. It is also possible to make the light source smaller. Furthermore, in the case that the amount of light of the light source is reduced, the amount of heat produced inside the electronic device is reduced. Therefore the design requirements for cooling are made simpler, and the mechanism for cooling can be simplified, providing further benefits in miniaturization.

Ninth Embodiment

As an eight embodiment of the present invention, other examples of various electronic devices using the above-described optical transducer are described with reference to FIGS. 19 to 22. In this embodiment, a reflecting liquid crystal panel is used for the optical transducer.

Description of the Reflecting Liquid Crystal Projector

Figure 19:
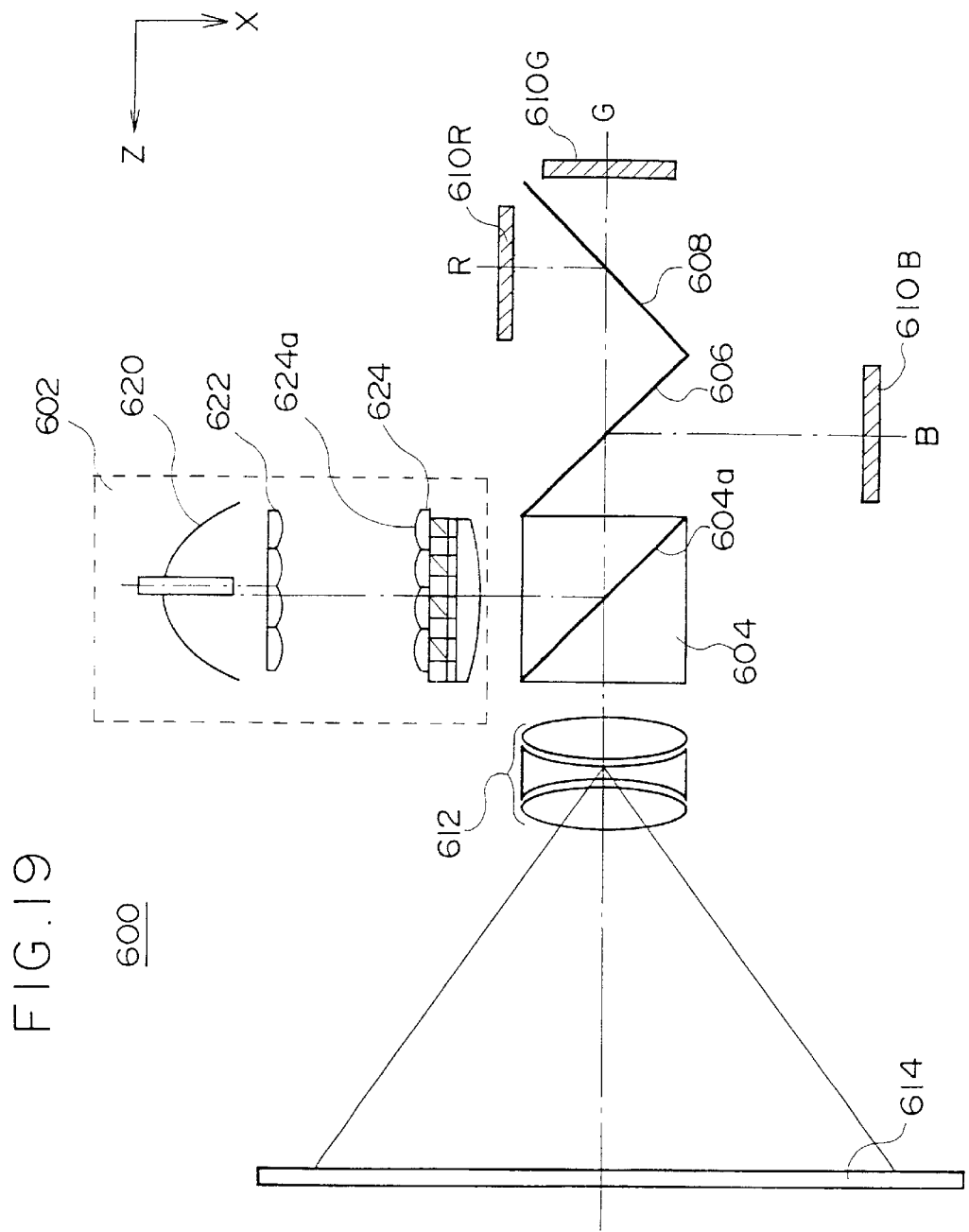
FIG. 19 is a schematic plan view of a projector, being an electronic device pertaining to a first example of an ninth embodiment of the present invention.

As a first example of the electronic device being the ninth embodiment, a projector (projecting display device) is shown, which uses a reflecting liquid crystal panel (optical switch) as a, light valve. FIG. 19 is a schematic plan view of the essential parts of the projector. Specifically, taking the system optical axis L from the light source as the x-axis, the section is in the x-z plane through the x-axis.

As shown in FIG. 19, a projector 600 has a polarized light device 602, a polarized beam splitter 604, dichroic mirrors 606 and 608, three reflecting liquid crystal light valves 610R, 610G, and 610B, a projection optical system 612, and a screen 614.

The polarized light device 602 schematically comprises a light source 620, an integrator lens 622, and a polarizing element 624, arranged along a system optical axis L. Light emitted by the light source 620 has a random plane of polarization. This emitted light is split by the integrator lens 622 into a plurality of intermediate light flux, and impinges to the polarizing apparatus 624.

On the side of the polarizing apparatus 624 that the light enters, is disposed another integrator lens 624*a*. The intermediate flux of light entering the polarizing apparatus 624 pass through the integrator lens 624*a* to enter the polarizing conversion element body 624b. The polarizing conversion element 624b employs the polarizing apparatus of the present invention, and is constructed to serve as both a polarizing apparatus and a polarizer. By means of the polarizing conversion element body 624b the intermediate light flux is converted to plane-polarized light flux (s-polarization light flux) of which direction of polarization substantially aligned, and the amount of light is amplified. Thereafter, this s-polarization light flux enters into the polarized beam splitter 604.

The polarized beam splitter 604 has an s-polarization light flux reflection plane 604a, and the incident s-polarization light flux is reflected by the s-polarization light flux reflection plane. In the reflected beam, the light flux of blue light B is further reflected by the blue light reflection layer of the dichroic mirror 606, and impinges on the reflecting liquid crystal light valve 610B for blue light. This light valve 610B modulates the blue light flux according to display information. In the light flux passing through the blue light reflection layer of the dichroic mirror 606, the light flux of red light R is reflected by the red light reflection layer of the other dichroic mirror 608, and impinges on the reflecting liquid crystal light valve 610R for red light. This light valve 610R modulates the red light flux according to display information. Further, the green light flux G passing through the red light reflection layer of the dichroic mirror 608 impinges on the reflecting liquid crystal light valve 610G for green light, and this light valve modulates the green light flux according to display information.

Next the reflecting liquid crystal panels used for the optical switches being the reflecting liquid crystal light valves 610R, 610G, and 610B are described. For these liquid crystal panels, a TN liquid crystal (liquid crystal orientation such that the long axes of the liquid crystal molecules are substantially parallel to the panel when no voltage is applied) or SH liquid crystal (liquid crystal orientation such that the long axes of the liquid crystal molecules are substantially orthogonal to the panel when no voltage is applied) may be applied.

If a TN liquid crystal is used, the reflection operates as follows. When the voltage applied across the liquid crystal layer sandwiched between a pixel reflection electrode and the common electrode of an opposing board is below the threshold voltage of the liquid crystal (an "off" pixel), incident colored light is elliptically polarized by the liquid crystal layer, and is reflected by the reflection electrode. As a result, the incident colored light is reflected and emitted through the liquid crystal layer in a state close to elliptical polarization in which the amount of polarized light component at approximately 90 degrees to the polarizing axes of the incident colored light is large. On the other hand, when the voltage applied is above the threshold voltage (an "on" pixel), the incident colored light penetrates directly to the reflection electrode with its polarization axis unchanged, and is reflected by the reflection electrode. As a result, colored light is reflected and emitted with the same axis of polarization as the incident light. Since the orientation angle of the liquid crystal molecules of the TN liquid crystal changes in response to the voltage applied to the reflection electrode, the angle of the polarization axis of the reflected colored light with respect to the incident colored light can be controlled according to the voltage corresponding to display information applied for each pixel to the reflection electrode by means of a transistor.

If an SH liquid crystal is used, the reflection operates as follows. When the voltage of a pixel applied across the liquid crystal layer is below the threshold voltage of the liquid crystal (an "off" pixel), incident colored light penetrates directly to the reflection electrode with its polarization axis unchanged, and is reflected there. In other words, colored light is reflected and emitted with the same axis of polarization as the incident light. On the other hand, when the voltage of a pixel applied is above the threshold voltage (an "on" pixel), the incident colored light is elliptically polarized by the liquid crystal layer, and reaches the reflection electrode. As a result, the colored light is reflected by the reflection electrode and emitted from the liquid crystal layer is elliptically polarized, with a large quantity of polarized light component at approximately 90 degrees to the incident colored light polarization. In the case of an SH liquid crystal, as in the case of a TN liquid crystal, since the orientation angle of the liquid crystal molecules changes in response to the voltage applied to the reflection electrode, the angle of the polarization axis of the reflected colored light with respect to the polarization axis of the incident colored light can be controlled according to the voltage corresponding to display information for each pixel applied to the reflection electrode by means of a transistor.

The colored light reflected by each of the reflecting liquid crystal light valves 610R, 610G, and 610B passes through the dichroic mirrors 606 and 608 to impinge on the polarized beam splitter 604. This polarized light flux splitter 604 is such as to reflect the s-polarization light flux, and therefore the s-polarization light flux does not pass through the splitter 604, whereas the p-polarization light flux does pass through the splitter 604. The various colored p-polarization light flux pass through the splitter 604 and are combined, forming an image corresponding to the display information. As a result, when a TN liquid crystal is used for the liquid crystal panels, only the reflected light from "off" pixels passes through the projection optical system 612, and therefore the image projected on the screen 614 is "normally white." By contrast, when an SH liquid crystal is used for the liquid crystal panels, only the reflected light from "on" pixels passes through to the projection optical system 612, and therefore the image projected on the screen 614 is "normally black."

For a reflecting liquid crystal panel, since the pixels are formed using semiconductor technology, compared with an active matrix liquid crystal panel in which a TFT array is formed on a glass substrate, a higher pixel count can be fabricated, and moreover the panel size can be reduced. Not only, therefore, can an image of higher detail be projected, but also the projector can be made more compact. Furthermore, since the polarizing conversion element of the present invention is used in place of a conventional polarizer, the polarized light device which is the largest component in terms of power consumption can be reduced to approximately ½ of the power consumption of a conventional unit, and can therefore be made more compact, and the entire unit of the projector made even more compact.

Description of the Reflecting Liquid Crystal Panel

As a second example of the electronic devices being the ninth embodiment of the present invention, various other electronic devices are described which use a reflecting liquid crystal panel (optical switch) constructed by applying the optical transducer of the present invention. The external appearance of these electronic devices is shown in FIGS. 20 to 22.

Figure 20:
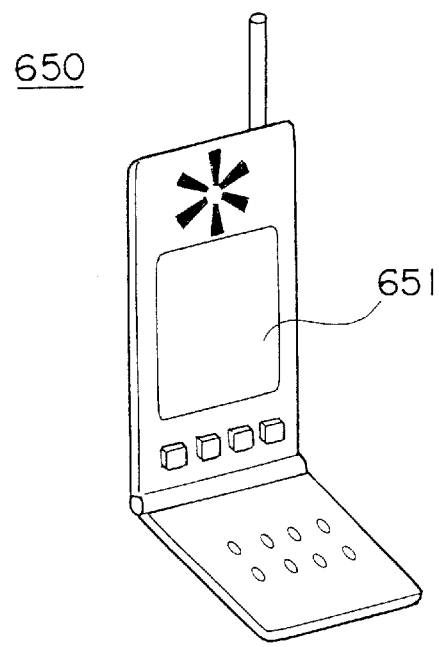
FIG. 20 is a schematic perspective view of a portable telephone, being a second example of the ninth embodiment of the present invention.

FIG. 20 is a perspective view of a portable telephone 650. The portable telephone 650 is equipped with a liquid crystal display 651 using the reflective liquid crystal panel which applies the optical transducer of the present invention.

Figure 21:
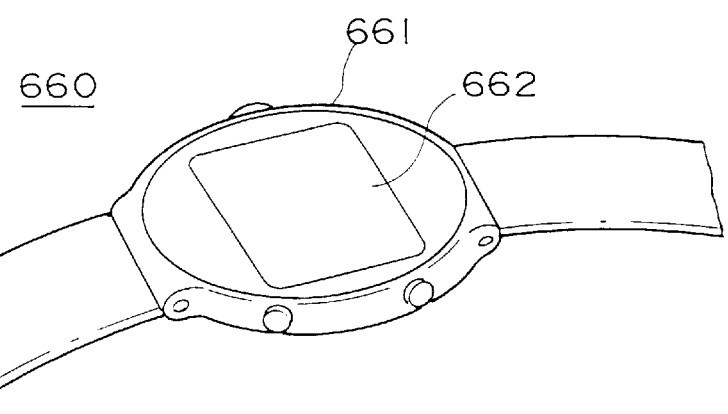
FIG. 21 is a schematic perspective view of an electronic device of the wrist-watch type, being another second example of the ninth embodiment of the present invention.

FIG. 21 is a perspective view of an electronic device of the wrist-watch type 660. The wrist-watch unit 661 of this device 660 is equipped with a liquid crystal display 662 using the reflective liquid crystal panel which applies the optical transducer of the present invention.

Figure 22:
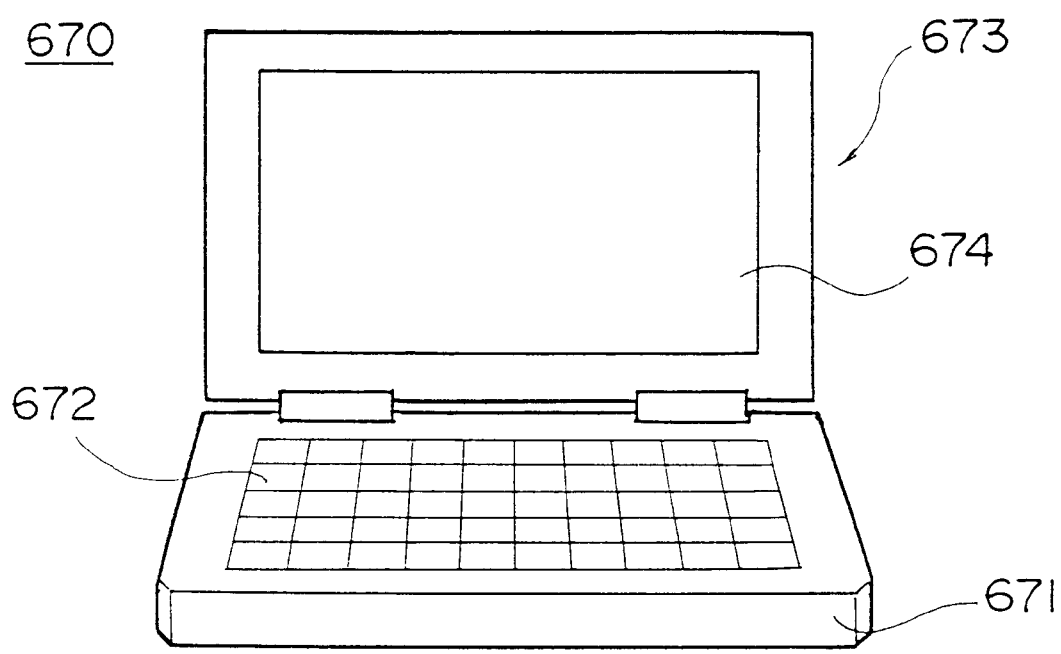
FIG. 22 is a schematic perspective view of a portable information processing device, being another second example of the ninth embodiment of the present invention.

Furthermore, FIG. 22 is a schematic perspective view of a portable information processing device 670 such as a word processor or a personal computer. The information processing device 670 is equipped with a main unit 671, an input section 672 such as a keyboard or the like provided on the main unit 671, a display section 673, and a liquid crystal display 674 using a reflective liquid crystal panel applying the optical transducer of the present invention provided on the display section 673.

Thus, in whichever of these electronic devices of the ninth embodiment, an optical transducer provided with a polarizing apparatus according to the present invention is mounted in an appropriate way such as to be directly visible from the front. Therefore, in the same way as in the embodiments described above, the quantity of polarized light impinging on the liquid crystal cell (liquid crystal substrate) and having a particular plane of polarization can be amplified. Thus using such a directly viewed unit, at maximum compared with the case in which a conventional polarizing filter is used, a display of approximately twice the brightness can be obtained. There is therefore a possibility of great improvement in visibility, not only in bright situations, but also in badly-lit situations, and moreover of, the richness of colors in a reflective color display.

It should be noted that the present invention is not limited to the above described embodiments, and a variety of embodiments are possible within the scope of the invention. For example, the polarizing apparatus of the present invention may be applied not only to the operation of a liquid crystal panel of the types described above, but also to a device of any type using a polarizing effect (for example, a polarizing microscope, a memory or recording device using a laser, an optical sensor, an illumination device, three-dimensional movies, or a projector).

As described above, with the polarizing apparatus according to the present invention, an optically active material is provided which is disposed so as to exhibit anisotropy of optical rotation, and by means of this optically active material the intensity of light flux having the particular plane of polarization is amplified, and the intensity of light having a plane of polarization perpendicular to the particular plane of polarization is reduced. By this means, another plane of polarization of a light flux having a different plane of polarization is rotated and added to the light flux having the particular plane of polarization. As a result, the light amount of the light flux having the particular plane of polarization can be amplified and extracted. Therefore, the waste which would arise when light having a particular plane of polarization of incident light for the purposes of display has extracted can be greatly reduced, and the efficiency of use of the light can be increased.

Moreover, with the optical transducer of the present invention, since the polarizing apparatus is disposed either directly in front of a liquid crystal cell or with an intervening polarizer, compared with a conventional device the efficiency of use of the incident light is high, and a display screen of high brightness can be made, or the power consumption of the light source can be greatly reduced, and moreover the reliability of the device can be increased.

Further by means of the electronic device of the present invention, since the optical transducer is included, the efficiency of use of the incident light is high, and a display screen of high brightness can be made, or the power consumption of the light source can be greatly reduced, and moreover with the improvement in the efficiency of use of the light, the functional reliability can be improved and the device made more compact.

What is claimed is:

1. A polarizing apparatus for polarizing incident light having planes of polarization to light having a particular plane of polarization, comprising:

an optically active material disposed so as to exhibit anisotropy with respect to the optical activity;

wherein said optically active material increases the intensity of luminous flux having said particular plane of polarization and reduces the intensity of luminous flux having a plane of polarization perpendicular to the particular plane of polarization;

wherein said optically active material comprises optically active molecules, and three-dimensional orientations of said optically active molecules are aligned in order to produce the anisotropy with respect to the optical activity; and wherein each of said optically active molecules comprises a rigid molecule portion, a chiral center joined thereto, and at least one substituent joined to said chiral center, wherein the direction from said rigid molecule portions to said chiral centers are substantially aligned in the same direction, and the three-dimensional orientations of said substituents seen from said chiral centers are aligned in substantially the same direction.

2. The polarizing apparatus according to claim 1, wherein said optically active material is formed with a polymer, and the three-dimensional orientations of said optically active molecules are substantially aligned by stretch-orientation of said polymer.

3. The polarizing apparatus as defined in claim 1, wherein said optically active material comprises various kinds of optically active materials, and one of said optically active materials exhibits waveform distribution characteristics which compensate for the waveform distribution characteristics with respect to optical activity in the visible light spectrum of another optically active material.

4. An optical transducer comprising:

the polarizing apparatus according to claim 1;

a polarizer for allowing a passage of luminous flux having said particular plane of polarization polarized by said polarizing apparatus;

a liquid crystal cell on which luminous flux passed through said polarizer is impinged on rotates said particular plane of polarization and allows said luminous flux to pass according to a liquid crystal orientation state; and an analyzer for allowing a passage of luminous flux emitted from said liquid crystal cell and having a particular plane of polarization.

5. The optical transducer according to claim 4, wherein a lamp unit is provided as a light source, and said polarizing apparatus is disposed immediately adjacent to the output side of said lamp unit.

6. The optical transducer according to claim 4, wherein said liquid crystal cell is one of a transmitting type and a reflecting type of liquid crystal cell.

7. An electronic device provided with the optical transducer as defined in claim 4, and having a display screen formed for displaying information depending on the state of liquid crystal molecules of said liquid crystal cell.

8. An optical transducer comprising:

the polarizing apparatus as defined in claim 1;

a liquid crystal call on which luminous flux having said particular plane of polarization polarized by said polarizing apparatus is impinged on selectively rotates said particular plane of polarization and allows said luminous flux to pass according to a liquid crystal orientation state; and an analyzer for allowing a passage of luminous flux emitted from said liquid crystal cell and having a particular plane of polarization.

9. The optical transducer according to claim 8, wherein a lamp unit is provided as a light source, and said polarizing apparatus is disposed immediately adjacent on the output side of said lamp unit.

10. The optical transducer according to claim 8, wherein said liquid crystal cell is one of a transmitting type and a reflecting type of liquid crystal cell.

11. An electronic device provided with the optical transducer according to claim 8, and having a display screen formed for displaying information depending on the state of liquid crystal molecules of said liquid crystal cell.

12. A polarizing apparatus for polarizing incident light having planes of polarization to light having a particular plane of polarization, comprising:

an optically active material disposed so as to exhibit anisotropy with respect to the optical activity; and wherein said optically active material increases the intensity of luminous flux having said particular plane of polarization and reduces the intensity of luminous flux having a plane of polarization perpendicular to the particular plane of polarization, has a given thickness in the passing direction of said incident light, and is divided into a plurality of layers in the direction of said given thickness, and the three-dimensional orientations of said optically active molecules in each layer is differently aligned for each layer so as to increase the intensity of luminous flux having said particular plane of polarization.

13. The polarizing apparatus according to claim 5, wherein said layers having the three-dimensional orientations of said optically active molecules and constituting each layer are aligned differently, so as to increase the intensity of luminous flux having said particular plane of polarization to a maximum.

14. The polarizing apparatus according to claim 12, wherein said layers are constituted by polarizing layers formed of said optically active material laminated in the direction of passage of light.

15. The polarizing apparatus according to claim 14, wherein said polarizing layers having the three-dimensional orientations of said optically active molecules and constituting each polarizing layer are aligned differently, so as to increase the intensity of luminous flux having said particular plane of polarization to a maximum.

16. An optical transducer comprising:

the polarizing apparatus according to claim 12;

a polarizer for allowing a passage of luminous flux having said particular plane of polarization polarized by said polarizing apparatus;

a liquid crystal cell on which luminous flux passed through said polarizer is impinged on, rotates said particular plane of polarization and allows said luminous flux to pass according to a liquid crystal orientation state; and an analyzer for allowing a passage of luminous flux emitted from said liquid crystal cell and having a particular plane of polarization.

17. The optical transducer according to claim 16, wherein a lamp unit is provided as a light source, and said polarizing apparatus is disposed immediately adjacent to the output side of said lamp unit.

18. The optical transducer according to claim 16, wherein said liquid crystal cell is one of a transmitting type and a reflecting type of liquid crystal cell.

19. An electronic device provided with the optical transducer as defined in claim 16, and having a display screen formed for displaying information depending on the state of liquid crystal molecules of said liquid crystal cell.

20. An optical transducer comprising:

the polarizing apparatus as defined in claim 12;

a liquid crystal cell on which luminous flux having said particular plane of polarization polarized by said polarizing apparatus is impinged on, selectively rotates said particular plane of polarization and allows said luminous flux to pass according to a liquid crystal orientation state; and an analyzer for allowing a passage of luminous flux emitted from said liquid crystal cell and having a particular plane of polarization.

21. The optical transducer according to claim 20, wherein a lamp unit is provided as a light source, and said polarizing apparatus is disposed immediately adjacent on the output side of said lamp unit.

22. The optical transducer according to claim 20, wherein said liquid crystal cell is one of a transmitting type and a reflecting type of liquid crystal cell.

23. An electronic device provided with the optical transducer according to claim 20, and having a display screen formed for displaying information depending on the state of liquid crystal molecules of said liquid crystal cell.

24. A polarizing apparatus for polarizing incident light having planes of polarization to light having a particular plane of polarization, comprising:

an optically active material disposed so as to exhibit anisotropy with respect to the optical activity; and wherein said optically active material increases the intensity of luminous flux having said particular plane of polarization and reduces the intensity of luminous flux having a plane of polarization perpendicular to the particular plane of polarization, and is constituted by an anisotropic crystalline structure having a thickness in the direction of passage of said incident light in order to amplify light having said particular plane of polarization and to reduce light having a plane of polarization perpendicular to said particular plane of polarization, when said incident light passes through said optically active material.

25. The polarizing apparatus according to claim 24, wherein said optically active material further includes a combined base polymer.

26. The polarizing apparatus according to claim 25, wherein said optically active material is combined in a state of solution in said base polymer.

27. The polarizing apparatus according to claim 26, wherein said base polymer is a water-soluble base polymer comprising at least one of polyvinyl alcohol, polyvinyl pyrollidone, and polyamino acid; and wherein said optically active material is a water-soluble optically active material comprising at least one of tartaric acid, lactic acid, tartrates, sugars, amino acids, and their derivatives.

28. The polarizing apparatus according to claim 26, wherein said base polymer is an organic solvent-soluble polymer comprising at lest one of polyvinyl acetate, polymethyl methacrylate, polyethyl methacrylate, epoxy resin, alkyd resin, urea resin, nitrocellulose, cellulose acetate, polyethylene terephthalate, nylon, phenol resin, phenol/resol resin, polyvinyl chloride, polyvinylidene chloride, vinyl chloride and vinyl acetate copolymer, and polystyrene and styrene/acrylonitrile copolymer; and wherein said optically active material is an organic solvent-soluble optically active material comprising at least one of chiral smectic C phase and I phase liquid crystals, liquid crystal composites, and amino acid esters.

29. The polarizing apparatus according to claim 25, wherein crystals of said optically active material having anisotropy with respect to optical activity are dispersed in combination with said base polymer.

30. The polarizing apparatus according to claim 29,
wherein said base polymer is an organic solvent-soluble polymer comprising at lest one of polyvinyl acetate, polymethyl methacrylate, polyethyl methacrylate, epoxy resin, alkyd resin, urea resin, nitrocellulose, cellulose acetate, polyethylene terephthalate, nylon, phenol resin, phenol/resol resin, polyvinyl chloride, polyvinylidene chloride, vinyl chloride and vinyl acetate copolymer, and polystyrene and styrene/acrylonitrile copolymer; and wherein said optically active material is an organic solvent-insoluble optically active material comprising at least one of quartz, cinnabar, lithium-potassium sulfate, sodium perchlorate, sodium bromate, sugars and their derivatives, and glycoprotein crystals.

31. The polarizing apparatus according to claim 29,
wherein said base polymer is a water-soluble base polymer comprising at least one of polyvinyl alcohol, polyvinyl pyrollidone, and polyamino acid; and wherein said optically active material is a water-insoluble optically active material comprising at least one of chiral smectic C phase and I phase liquid crystal, quartz, and cinnabar crystals.

32. The polarizing apparatus according to claim 31, wherein said optically active material has an anisotropic structure, and preferably has a rod-like crystal structure.

33. The polarizing apparatus according to claim 25, wherein said base polymer has combined therewith an optically active material being formed of water-soluble macromolecules, and having as a constituent substance at least one of polyamino acids, main chain, side chain macromolecular liquid crystals, polysaccharides, glycoproteins, and their derivatives.

34. The polarizing apparatus according to claim 33, wherein said base polymer has wavelength distribution characteristics so as to compensate for the wavelength distribution characteristics with respect to optical activity of said optically active material combined with said base polymer.

35. The polarizing apparatus according to claim 25, wherein said base polymer includes an optically active material being formed of organic solvent-soluble macromolecules, and having a polyester type macromolecular liquid crystal in which the monomer element has a chiral center.

36. An optical transducer comprising:
the polarizing apparatus according to claim 24;
a polarizer for allowing a passage of luminous flux having said particular plane of polarization polarized by said polarizing apparatus;
a liquid crystal cell on which luminous flux passed through said polarizer is impinged on, rotates said particular plane of polarization and allows said luminous flux to pass according to a liquid crystal orientation state; and
an analyzer for allowing a passage of luminous flux emitted from said liquid crystal cell and having a particular plane of polarization.

37. The optical transducer according to claim 36, wherein a lamp unit is provided as a light source, and said polarizing apparatus is disposed immediately adjacent to the output side of said lamp unit.

38. The optical transducer according to claim 36, wherein said liquid crystal cell is one of a transmitting type and a reflecting type of liquid crystal cell.

39. An electronic device provided with the optical transducer as defined in claim 36, and having a display screen formed for displaying information depending on the state of liquid crystal molecules of said liquid crystal cell.

40. An optical transducer comprising:
the polarizing apparatus as defined in claim 24;
a liquid crystal cell on which luminous flux having said particular plane of polarization polarized by said polarizing apparatus is impinged on, selectively rotates said particular plane of polarization and allows said luminous flux to pass according to a liquid crystal orientation state; and
an analyzer for allowing a passage of luminous flux emitted from said liquid crystal cell and having a particular plane of polarization.

41. The optical transducer according to claim 40, wherein a lamp unit is provided as a light source, and said polarizing apparatus is disposed immediately adjacent on the output side of said lamp unit.

42. The optical transducer according to claim 40, wherein said liquid crystal cell is one of a transmitting type and a reflecting type of liquid crystal cell.

43. An electronic device provided with the optical transducer according to claim 40, and having a display screen formed for displaying information depending on the state of liquid crystal molecules of said liquid crystal cell.

44. A polarizing apparatus for polarizing incident light having planes of polarization to light having a particular plane of polarization, comprising:
an optically active material disposed so as to exhibit anisotropy with respect to the optical activity; and
wherein said optically active material increases the intensity of luminous flux having said particular plane of polarization and reduces the intensity of luminous flux having a plane of polarization perpendicular to the particular plane of polarization, is a liquid, and includes a fluid sugar solution that exhibits optical activity and is sandwiched between two transparent plates, each of which has a surface provided with an oriented film facing another oriented film.

45. The polarizing apparatus according to claim 44, wherein the optically active material includes a ferroelectric liquid crystal having fluidity and exhibiting optical activity is sandwiched between the two transparent plates having surfaces provided with transparent electrodes so that a voltage can be applied between said electrodes.

46. An optical transducer comprising:
the polarizing apparatus according to claim 44;
a polarizer for allowing a passage of luminous flux having said particular plane of polarization polarized by said polarizing apparatus;
a liquid crystal cell on which luminous flux passed through said polarizer is impinged on, rotates said particular plane of polarization and allows said luminous flux to pass according to a liquid crystal orientation state; and an analyzer for allowing a passage of luminous flux emitted from said liquid crystal cell and having a particular plane of polarization.

47. The optical transducer according to claim 46, wherein a lamp unit is provided as a light source, and said polarizing apparatus is disposed immediately adjacent to the output side of said lamp unit.

48. The optical transducer according to claim 46, wherein said liquid crystal cell is one of a transmitting type and a reflecting type of liquid crystal cell.

49. An electronic device provided with the optical transducer as defined in claim 46, and having a display screen formed for displaying information depending on the state of liquid crystal molecules of said liquid crystal cell.

50. An optical transducer comprising:

the polarizing apparatus as defined in claim 44;

a liquid crystal cell on which luminous flux having said particular plane of polarization polarized by said polarizing apparatus is impinged on, selectively rotates said particular plane of polarization and allows said luminous flux to pass according to a liquid crystal orientation state; and an analyzer for allowing a passage of luminous flux emitted from said liquid crystal cell and having a particular plane of polarization.

51. The optical transducer according to claim 50, wherein a lamp unit is provided as a light source, and said polarizing apparatus is disposed immediately adjacent on the output side of said lamp unit.

52. The optical transducer according to claim 50, wherein said liquid crystal cell is one of a transmitting type and a reflecting type of liquid crystal cell.

53. An electronic device provided with the optical transducer according to claim 50, and having a display screen formed for displaying information depending on the state of liquid crystal molecules of said liquid crystal cell.

54. An optical transducer comprising:

a polarizing apparatus for polarizing incident light having planes of polarization to light having a particular plane of polarization, comprising;

an optically active material disposed so as to exhibit anisotropy with respect to the optical activity;

wherein said optically active material increases the intensity of luminous flux having said particular plane of polarization and reduces the intensity of luminous flux having a plane of polarization perpendicular to the particular plane of polarization; and a polarizer for allowing a passage of luminous flux having said particular plane of polarization polarized by said polarizing apparatus;

a liquid crystal cell on which luminous flux passed through said polarizer is impinged on, rotates said particular plane of polarization and allows said luminous flux to pass according to a liquid crystal orientation state; and an analyzer for allowing a passage of luminous flux emitted from said liquid crystal cell and having a particular place of polarization.

55. The optical transducer according to claim 54, wherein a lamp unit is provided as a light source, and said polarizing apparatus is disposed immediately adjacent to the output side of said lamp unit.

56. The optical transducer according to claim 54, wherein said liquid crystal cell is one of a transmitting type and a reflecting type of liquid crystal cell.

57. An electronic device provided with the optical transducer as defined in claim 54, and having a display screen formed for displaying information depending on the state of liquid crystal molecules of said liquid crystal cell.

58. An optical transducer comprising:

the polarizing apparatus as defined in claim 54;

a liquid crystal cell on which luminous flux having said particular plane of polarization polarized by said polarizing apparatus is impinged on, selectively rotates said particular plane of polarization and allows said luminous flux to pass according to a liquid crystal orientation state; and an analyzer for allowing a passage of luminous flux emitted from said liquid crystal cell and having a particular plane of polarization.

59. The optical transducer according to claim 58, wherein a lamp unit is provided as a light source, and said polarizing apparatus is disposed immediately adjacent on the output side of said lamp unit.

60. The optical transducer according to claim 58, wherein said liquid crystal cell is one of a transmitting type and a reflecting type of liquid crystal cell.

61. An electronic device provided with the optical transducer according to claim 58, and having a display screen formed for displaying information depending on the state of liquid crystal molecules of said liquid crystal cell.

62. A method of manufacturing a polarizing apparatus for polarizing incident light into light having a particular plane of polarization comprising:

a combining step for combining a base polymer and an optically active material;

a casting step for pouring the combined solution into a film wherein in said casting step, said combined solution is poured along at least one groove whereby said optically active material is oriented;

a drying step for drying and hardening the solution formed into a film; and a stretching step for applying tension to and stretching the hardened film.

* * * * *